(12) United States Patent
Kawano

(10) Patent No.: US 10,661,631 B2
(45) Date of Patent: May 26, 2020

(54) HEAT PUMP CYCLE

(71) Applicant: DENSO CORPORATION, Kariya, Aichi-pref. (JP)

(72) Inventor: Hiroaki Kawano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 208 days.

(21) Appl. No.: 15/546,492

(22) PCT Filed: Feb. 4, 2016

(86) PCT No.: PCT/JP2016/053383
§ 371 (c)(1),
(2) Date: Jul. 26, 2017

(87) PCT Pub. No.: WO2016/129498
PCT Pub. Date: Aug. 18, 2016

(65) Prior Publication Data
US 2018/0022185 A1    Jan. 25, 2018

(30) Foreign Application Priority Data
Feb. 9, 2015 (JP) ................................ 2015-023217

(51) Int. Cl.
*B60H 1/00* (2006.01)
*F25B 41/04* (2006.01)
(Continued)

(52) U.S. Cl.
CPC ..... *B60H 1/00899* (2013.01); *B60H 1/00885* (2013.01); *B60H 1/00907* (2013.01);
(Continued)

(58) Field of Classification Search
CPC ............ B60H 1/00899; B60H 1/00921; B60H 1/3213; F25B 41/04; F25B 49/02
See application file for complete search history.

(56) References Cited

U.S. PATENT DOCUMENTS

| | | | | |
|---|---|---|---|---|
| 6,237,351 B1 * | 5/2001 | Itoh | ..................... | B60H 1/00921 62/113 |
| 2012/0255319 A1 * | 10/2012 | Itoh | ....................... | F24F 3/1405 62/160 |
| 2013/0312447 A1 * | 11/2013 | Inaba | ...................... | F25B 43/00 62/324.6 |

FOREIGN PATENT DOCUMENTS

| | | | |
|---|---|---|---|
| JP | 2002310520 A | * | 10/2002 |
| JP | 2011127623 A | | 6/2011 |
| JP | 2012254670 A | | 12/2012 |

OTHER PUBLICATIONS

Okazaki et al., Refrigerant Control Method for Air Conditioner and the Air Conditioner, Oct. 23, 2002, JP2002310520A, Whole Document (Year: 2002).*

* cited by examiner

*Primary Examiner* — Larry L Furdge
(74) *Attorney, Agent, or Firm* — Harness, Dickey & Pierce, P.L.C.

(57) ABSTRACT

A heat pump cycle includes a compressor, a first interior heat exchanger, a separator that separates a refrigerant discharged from the compressor into a gas-phase refrigerant which does not include a lubricant and a remaining refrigerant, an exterior heat exchanger that performs heat exchange between the remaining refrigerant flowing out of the separator and an outside air, a second interior heat exchanger, a control valve, an accumulator, and a first bypass passage that bypasses the second interior heat exchanger and connects to an inlet side of the accumulator. The heat pump cycle heats an air flow in the first interior heat exchanger and controls the control valve to reduce the pressure of the refrigerant, in a state where the refrigerant circulates in a refrigerant circuit including the first bypass passage while accumulating the (Continued)

gas-phase refrigerant flowing out of the separator in the second interior heat exchanger.

5 Claims, 9 Drawing Sheets

(51) Int. Cl.
  *F25B 41/00* (2006.01)
  *F25B 49/02* (2006.01)
  *B60H 1/22* (2006.01)
  *B60H 1/32* (2006.01)
  *F25B 6/04* (2006.01)
  *F25B 5/04* (2006.01)

(52) U.S. Cl.
  CPC .......... *B60H 1/00921* (2013.01); *B60H 1/22* (2013.01); *B60H 1/3213* (2013.01); *F25B 41/003* (2013.01); *F25B 41/04* (2013.01); *F25B 49/02* (2013.01); *B60H 2001/3267* (2013.01); *F25B 5/04* (2013.01); *F25B 6/04* (2013.01); *F25B 2341/0662* (2013.01); *F25B 2400/0403* (2013.01); *F25B 2400/0409* (2013.01); *F25B 2400/0411* (2013.01); *F25B 2400/13* (2013.01); *F25B 2400/23* (2013.01); *F25B 2600/2501* (2013.01); *F25B 2700/04* (2013.01); *F25B 2700/195* (2013.01); *F25B 2700/1931* (2013.01); *F25B 2700/2104* (2013.01); *F25B 2700/2106* (2013.01); *F25B 2700/21161* (2013.01); *F25B 2700/21163* (2013.01); *F25B 2700/21173* (2013.01); *F25B 2700/21175* (2013.01)

HEATING MODE — NORMAL HEATING MODE ➡
LIQUID ACCUMULATING MODE ➡ ⇨
REFRIGERANT SHORTAGE MODE ➡ ⇛

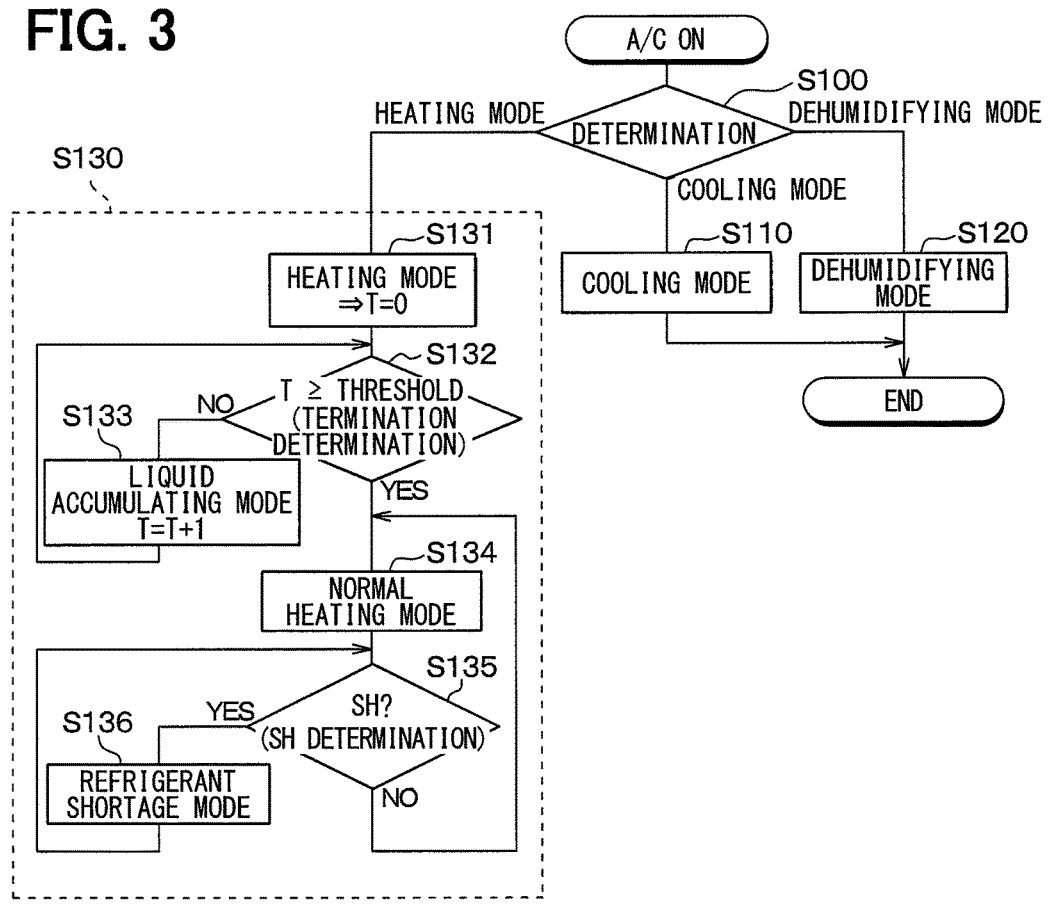

COOLING / DEHUMIDIFYING MODE

NORMAL COOLING MODE →
LIQUID ACCUMULATING MODE ⇒
REFRIGERANT SHORTAGE MODE →³

COOLING MODE

FIG. 8

| MODE | ACTUATOR NUMBER | | | | | | | | |
|---|---|---|---|---|---|---|---|---|---|
| | 70 | 13 | 16a | 60 | 16b | 16c | 22 | 61 | 71 |
| NORMAL COOLING MODE | FLOW CHANNEL 2 | FULLY CLOSED | CLOSED | CLOSED | OPEN | CLOSED | FB CONTROL (E.g. COOLING PERFORMANCE) | FB CONTROL (FROST PREVENTION) | FLOW CHANNEL 2 |
| LIQUID ACCUMULATING MODE | FLOW CHANNEL 2 | FULLY CLOSED | CLOSED | OPEN | OPEN | CLOSED | FB CONTROL (E.g. COOLING PERFORMANCE) | FB CONTROL (FROST PREVENTION) | FLOW CHANNEL 2 |
| REFRIGERANT SHORTAGE MODE | FLOW CHANNEL 2 | FULLY CLOSED | CLOSED | CLOSED | OPEN | CLOSED | FB CONTROL (E.g. COOLING PERFORMANCE) | FB CONTROL (FROST PREVENTION) | FLOW CHANNEL 3 |

FIG. 9

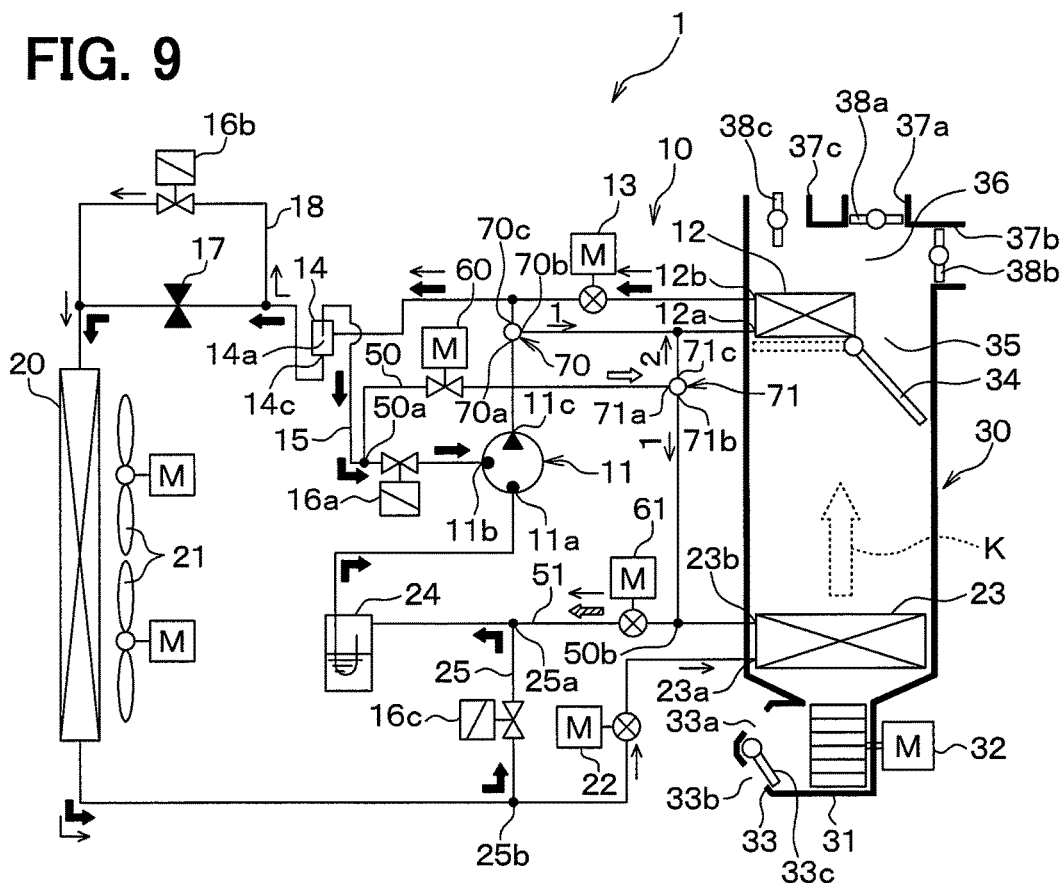

NORMAL COOLING MODE ➡
LIQUID ACCUMULATING MODE ➡ ⇨
REFRIGERANT SHORTAGE MODE ➡ ⇛
DEHUMIDIFYING MODE →

HEATING / DEHUMIDIFYING MODE

FIG. 10

| MODE | ACTUATOR NUMBER | | | | | | | | |
|---|---|---|---|---|---|---|---|---|---|
| | 70 | 13 | 16a | 60 | 16b | 16c | 22 | 61 | 71 |
| NORMAL HEATING MODE | FLOW CHANNEL 1 | FB CONTROL (E.G. HEATING PERFORMANCE) | OPEN | CLOSED | CLOSED | OPEN | FULLY CLOSED | FULLY CLOSED | FLOW CHANNEL 1 |
| LIQUID ACCUMULATING MODE | FLOW CHANNEL 1 | FB CONTROL (E.G. HEATING PERFORMANCE) | OPEN (CLOSED) | OPEN | CLOSED | OPEN | FULLY CLOSED | FULLY CLOSED | FLOW CHANNEL 1 |
| REFRIGERANT SHORTAGE MODE | FLOW CHANNEL 1 | FB CONTROL (E.G. HEATING PERFORMANCE) | OPEN | CLOSED | CLOSED | OPEN | FULLY CLOSED | FB CONTROL (SH) | FLOW CHANNEL 1 |

FIG. 12

| MODE | ACTUATOR NUMBER | | | | | | | | | |
|---|---|---|---|---|---|---|---|---|---|---|
| | 70 | 13 | 16a | 60 | 16b | 16c | 22 | 61 | 71 |
| NORMAL DEHUMIDIFYING MODE | FLOW CHANNEL 1 | FB CONTROL (E.G. HEATING PERFORMANCE) | CLOSED/OPEN | CLOSED | OPEN | CLOSED | FB CONTROL (E.G. HEATING PERFORMANCE) | FB CONTROL (FROST PREVENTION) | FLOW CHANNEL 1 OR 2 |
| LIQUID ACCUMULATING MODE | FLOW CHANNEL 1 | FB CONTROL (OVERFLOW) | CLOSED/OPEN | CLOSED | OPEN | CLOSED | FB CONTROL (OVERFLOW) | FB CONTROL (FROST PREVENTION) | FLOW CHANNEL 1 OR 2 |
| REFRIGERANT SHORTAGE MODE | FLOW CHANNEL 1 | FB CONTROL (SH) | CLOSED/OPEN | CLOSED | OPEN | CLOSED | FB CONTROL (SH) | FB CONTROL (FROST PREVENTION) | FLOW CHANNEL 1 OR 2 |

HEAT PUMP CYCLE

CROSS REFERENCE TO RELATED APPLICATIONS

This application is a U.S. National Phase Application under 35 U.S.C. 371 of International Application No. PCT/JP2016/053383 filed on Feb. 4, 2016 and published in Japanese as WO 2016/129498 A1 on Aug. 18, 2016. This application is based on and claims the benefit of priority from Japanese Patent Application No. 2015-023217 filed on Feb. 9, 2015. The entire disclosures of all of the above applications are incorporated herein by reference.

TECHNICAL FIELD

The present disclosure relates to a heat pump cycle.

BACKGROUND ART

Up to now, a heat pump cycle for a vehicle air conditioning apparatus includes a compressor, a heating interior heat exchanger, a cooling interior heat exchanger, first and second expansion valves, an exterior heat exchanger, first and second electromagnetic valves, first and second bypass passages, and an accumulator (for example, refer to Patent Document 1).

In the above heat pump cycle, the heating interior heat exchanger heats a vehicle interior air by the aid of a high-pressure refrigerant discharged from the compressor. The first expansion valve controls the opening degree of a refrigerant flow channel between an outlet of the heating interior heat exchanger and an inlet of the exterior heat exchanger. The exterior heat exchanger exchanges a heat between a refrigerant that has passed through the first expansion valve and an outside air.

The second expansion valve controls the opening degree of a refrigerant flow channel between an outlet of the exterior heat exchanger and an inlet of the cooling interior heat exchanger. The cooling interior heat exchanger cools the vehicle interior air using the refrigerant whose pressure is reduced by the second expansion valve.

The accumulator separates the refrigerant that has passed through the cooling interior heat exchanger into a gas-phase refrigerant and a liquid-phase refrigerant to accumulate the liquid-phase refrigerant as an excessive refrigerant, and supplies the gas-phase refrigerant to an inlet of the compressor. The excessive refrigerant is a refrigerant that is not necessary for operating a cooling mode, a heating mode, and the like.

The first bypass passage connects the outlet of the exterior heat exchanger and an inlet of the accumulator by bypassing the cooling interior heat exchanger and the second expansion valve. The first electromagnetic valve opens and closes the first bypass passage. The second bypass passage connects the outlet of the heating interior heat exchanger and an inlet of the second expansion valve by bypassing the first expansion valve and the exterior heat exchanger. The second electromagnetic valve opens and closes the second bypass passage.

In the cooling mode, the first expansion valve is opened so that a pressure reducing action is not caused to the refrigerant by the first expansion valve, and the first and second electromagnetic valves are closed. Further, the second expansion valve is set to a throttle opening degree causing a pressure reducing action to be exerted on the refrigerant. This produces a refrigerant circuit that causes the refrigerant discharged from the compressor to flow in the heating interior heat exchanger, the first expansion valve, the exterior heat exchanger, the second expansion valve, the cooling interior heat exchanger, the accumulator, and the compressor in the stated order.

In the heating mode, the first expansion valve is set to the throttle opening degree for causing the pressure reducing action, the first and second electromagnetic valves are opened, and the second expansion valve is closed. This produces a refrigerant circuit for causing the refrigerant discharged from the compressor to flow the heating interior heat exchanger, the first expansion valve, the exterior heat exchanger, the first bypass passage, the first electromagnetic valve, the accumulator, and the compressor in the stated order. Therefore, in the heating mode, no refrigerant passes through the cooling interior heat exchanger. For that reason, the refrigerant circuit in the heating mode is smaller in the capacity of the flow channel through which the refrigerant flows than the refrigerant circuit in the cooling mode. Therefore, the amount of the excessive refrigerant in the heating mode is larger than the amount of the excessive refrigerant in the cooling mode.

Therefore, in the heating mode, in order to reduce the amount of the excessive refrigerant accumulated in the accumulator, a part of the refrigerant that has passed through the heating interior heat exchanger is caused to flow in the second bypass passage through the second electromagnetic valve. As a result, in the heating mode, the excessive refrigerant can be accumulated in the second bypass passage. Therefore, in the heating mode, since the amount of the excessive refrigerant accumulated in the accumulator can be reduced, a size of the accumulator can be reduced.

PRIOR ART DOCUMENT

Patent Document

Patent Document 1: JP 2012-254670 A

SUMMARY

In general, the amount of refrigerant to be enclosed in the heat pump cycle is set to an amount obtained by adding a predetermined excess amount to a maximum circulation flow rate required to circulate in the refrigerant circuit in order to exert a maximum refrigeration capacity on the heat pump cycle in consideration of a leakage of the refrigerant. For that reason, even in the cooling mode other than the heating mode, there is a need to accumulate a predetermined amount of the excessive refrigerant in the accumulator, which hinders miniaturization of the accumulator body.

Further, in the heat pump cycle, in order to reduce the size of the accumulator, although the excessive refrigerant can be accumulated in the second bypass passage while the heating mode is in operation, a lubricant is included in the refrigerant accumulated in the second bypass passage. Therefore, there is a possibility that the lubricant to be supplied to the compressor becomes insufficient and the compressor does not smoothly operate during the implementation of the heating mode.

In view of the foregoing points, an object of the present disclosure is to provide a heat pump cycle that reduces a shortage of lubricant to be supplied to a compressor while achieving miniaturization of an accumulator.

According to an aspect of the present disclosure, a heat pump cycle includes: a compressor that draws a refrigerant containing a lubricant, compresses the drawn refrigerant, and discharges the compressed refrigerant as a high-pressure refrigerant; a first interior heat exchanger in which the high-pressure refrigerant heats an air flow blown into a vehicle interior; a separator that separates the refrigerant discharged from the compressor into a gas-phase refrigerant which does not include the lubricant and a remaining refrigerant other than the gas-phase refrigerant; an exterior heat exchanger that performs heat exchange between the remaining refrigerant that has flowed out of the separator and an outside air; a second interior heat exchanger in which the refrigerant that has passed through the exterior heat exchanger cools the air flow; a first control valve that controls an opening degree of a refrigerant flow channel positioned between an outlet of the first interior heat exchanger and an inlet of the separator; a second control valve that controls an opening degree of a refrigerant flow channel positioned between an outlet of the exterior heat exchanger and an inlet of the second interior heat exchanger; an accumulator that separates a refrigerant that has flowed out of the second interior heat exchanger into a liquid-phase refrigerant and a gas-phase refrigerant, and supplies the gas-phase refrigerant to the compressor while accumulating the liquid-phase refrigerant; a first bypass passage that bypasses the second interior heat exchanger and the second control valve to connect an inlet of the accumulator and the outlet of the exterior heat exchanger; and a control unit configured to heat the air flow in the first interior heat exchanger and control the first control valve to reduce a pressure of the refrigerant by controlling the opening degree of the refrigerant flow channel positioned between the outlet of the first interior heat exchanger and the inlet of the separator in a state where the control unit circulates the refrigerant in a refrigerant circuit including the compressor, the first interior heat exchanger, the first control valve, the separator, the exterior heat exchanger, the first bypass passage and the accumulator while the control unit accumulating the gas-phase refrigerant that has flowed out of the separator in the second interior heat exchanger.

According to the above aspect, the gas-phase refrigerant discharged from the separator can be accumulated in the second interior heat exchanger. For that reason, a capacity of the accumulator for accumulating the refrigerant can be reduced. Therefore, the size of the accumulator can be reduced.

In addition to the above configuration, the gas-phase refrigerant accumulated in the second interior heat exchanger is the refrigerant from which the lubricant has been removed in the separator. For that reason, the remaining refrigerant including the lubricant can be supplied to the compressor. Hence, a shortage of the lubricant to be supplied to the compressor can be reduced.

As described above, the heat pump cycle that reduces the shortage of the lubricant to be supplied to the compressor while reducing the size of the accumulator can be provided.

According to another aspect of the present disclosure, a heat pump cycle includes: a compressor that draws a refrigerant containing a lubricant, compresses the drawn refrigerant, and discharges the compressed refrigerant as a high-pressure refrigerant; a first interior heat exchanger in which the high-pressure refrigerant heats an air flow blown into a vehicle interior; a separator that separates the refrigerant discharged from the compressor into a gas-phase refrigerant which does not include the lubricant and a remaining refrigerant other than the gas-phase refrigerant; an exterior heat exchanger that performs heat exchange between the remaining refrigerant that has flowed out of the separator and an outside air; a second interior heat exchanger in which the refrigerant that has passed through the exterior heat exchanger cools the air flow; a first control valve that controls an opening degree of a refrigerant flow channel positioned between an outlet of the first interior heat exchanger and an inlet of the separator; a second control valve that controls an opening degree of a refrigerant flow channel positioned between an outlet of the exterior heat exchanger and an inlet of the second interior heat exchanger; an accumulator that separates a refrigerant that has flowed out of the second interior heat exchanger into a liquid-phase refrigerant and a gas-phase refrigerant, and supplies the gas-phase refrigerant to the compressor while accumulating the liquid-phase refrigerant; and a control unit configured to cool the air flow in the second interior heat exchanger and control the second control valve to reduce a pressure of the refrigerant by controlling the opening degree of the refrigerant flow channel positioned between the outlet of the exterior heat exchanger and the inlet of the second interior heat exchanger in a state where the control unit circulates the refrigerant in a refrigerant circuit including the compressor, the separator, the exterior heat exchanger, the second control valve, the second interior heat exchanger and the accumulator while the control unit accumulating the gas-phase refrigerant that has flowed out of the separator in the first interior heat exchanger.

According to the above aspect, the gas-phase refrigerant discharged from the separator can be accumulated in the first interior heat exchanger. For that reason, a capacity of the accumulator for accumulating the refrigerant can be reduced. Therefore, the size of the accumulator can be reduced.

In addition to the above configuration, the gas-phase refrigerant accumulated in the first interior heat exchanger is the refrigerant from which the lubricant has been removed in the separator. For that reason, the remaining refrigerant including the lubricant can be supplied to the compressor. Hence, a shortage of the lubricant to be supplied to the compressor can be reduced.

As described above, the heat pump cycle that reduces the shortage of the lubricant to be supplied to the compressor while reducing the size of the accumulator can be provided.

According to another aspect of the present disclosure, a heat pump cycle includes: a compressor that draws a refrigerant containing a lubricant, compresses the drawn refrigerant, and discharges the compressed refrigerant as a high-pressure refrigerant; a first interior heat exchanger in which the high-pressure refrigerant heats an air flow blown into a vehicle interior; a separator that separates the refrigerant discharged from the compressor into a gas-phase refrigerant which does not include the lubricant and a remaining refrigerant other than the gas-phase refrigerant; an exterior heat exchanger that performs heat exchange between the remaining refrigerant that has flowed out of the separator and an outside air; a second interior heat exchanger in which the refrigerant that has passed through the exterior heat exchanger cools the air flow; a first control valve that controls an opening degree of a refrigerant flow channel positioned between an outlet of the first interior heat exchanger and an inlet of the separator; a second control valve that controls an opening degree of a refrigerant flow channel positioned between an outlet of the exterior heat exchanger and an inlet of the second interior heat exchanger; an accumulator that separates a refrigerant that has flowed out of the second interior heat exchanger into a liquid-phase refrigerant and a gas-phase refrigerant, and supplies the gas-phase refrigerant to the compressor while accumulating the liquid-phase refrigerant; a first bypass passage that bypasses the second interior heat exchanger and the second control valve to connect an inlet of the accumulator and the outlet of the exterior heat exchanger; an air conditioning mode determination unit configured to determine which air conditioning mode is to be implemented, a heating mode for heating the vehicle interior or a cooling mode for cooling the vehicle interior; a first control unit configured to heat the air flow in the first interior heat exchanger and control the first control valve to reduce a pressure of the refrigerant by controlling the opening degree of the refrigerant flow channel positioned between the outlet of the first interior heat exchanger and the inlet of the separator in a state where the first control unit circulates the refrigerant in a first refrigerant circuit including the compressor, the first interior heat exchanger, the first control valve, the separator, the exterior heat exchanger, the first bypass passage and the accumulator while the first control unit accumulating the gas-phase refrigerant that has flowed out of the separator in the second interior heat exchanger, when the air conditioning mode determination unit determines that the heating mode is to be implemented; and a second control unit configured to cool the air flow in the second interior heat exchanger and control the second control valve to reduce the pressure of the refrigerant by controlling the opening degree of the refrigerant flow channel positioned between the outlet of the exterior heat exchanger and the inlet of the second interior heat exchanger in a state where the second control unit circulates the refrigerant in a second refrigerant circuit including the compressor, the separator, the exterior heat exchanger, the second control valve, the second interior heat exchanger and the accumulator while the second control unit accumulating the gas-phase refrigerant that has flowed out of the separator in the first interior heat exchanger, when the air conditioning mode determination unit determines that the cooling mode is to be implemented.

According to the above aspect, when the air conditioning mode determination unit determines that the heating mode is to be implemented, the gas-phase refrigerant discharged from the separator can be accumulated in the second interior heat exchanger. For that reason, a capacity of the accumulator for accumulating the refrigerant can be reduced. The gas-phase refrigerant accumulated in the second interior heat exchanger is the refrigerant from which the lubricant has been removed in the separator. For that reason, the remaining refrigerant including the lubricant can be supplied to the compressor. Hence, a shortage of the lubricant to be supplied to the compressor can be reduced.

On the other hand, when the air conditioning mode determination unit determines that the cooling mode is to be implemented, the gas-phase refrigerant discharged from the separator can be accumulated in the first interior heat exchanger. For that reason, a capacity of the accumulator for accumulating the refrigerant can be reduced. The gas-phase refrigerant accumulated in the first interior heat exchanger is the refrigerant from which the lubricant has been removed in the separator. For that reason, the remaining refrigerant including the lubricant can be supplied to the compressor. Hence, a shortage of the lubricant to be supplied to the compressor can be reduced.

As described above, the heat pump cycle that reduces the shortage of the lubricant to be supplied to the compressor while reducing the size of the accumulator can be provided.

BRIEF DESCRIPTION OF THE DRAWINGS

FIG. 3 is a flowchart illustrating a control process of an electronic control device in FIG. 2.

FIG. 4 is a diagram illustrating an operation state of an actuator in FIG. 1.

FIG. 8 is a diagram illustrating an operation state of an actuator in a cooling mode according to the second embodiment.

FIG. 9 is a diagram illustrating the overall configuration of the heat pump cycle according to the second embodiment, which is a diagram illustrating the flow of the refrigerant in a heating mode.

FIG. 10 is a diagram illustrating the operation state of the actuator in the cooling mode according to the second embodiment.

FIG. 12 is a diagram illustrating the operation state of the actuator in the dehumidifying mode according to the second embodiment.

DESCRIPTION OF EMBODIMENTS

Figure 1:
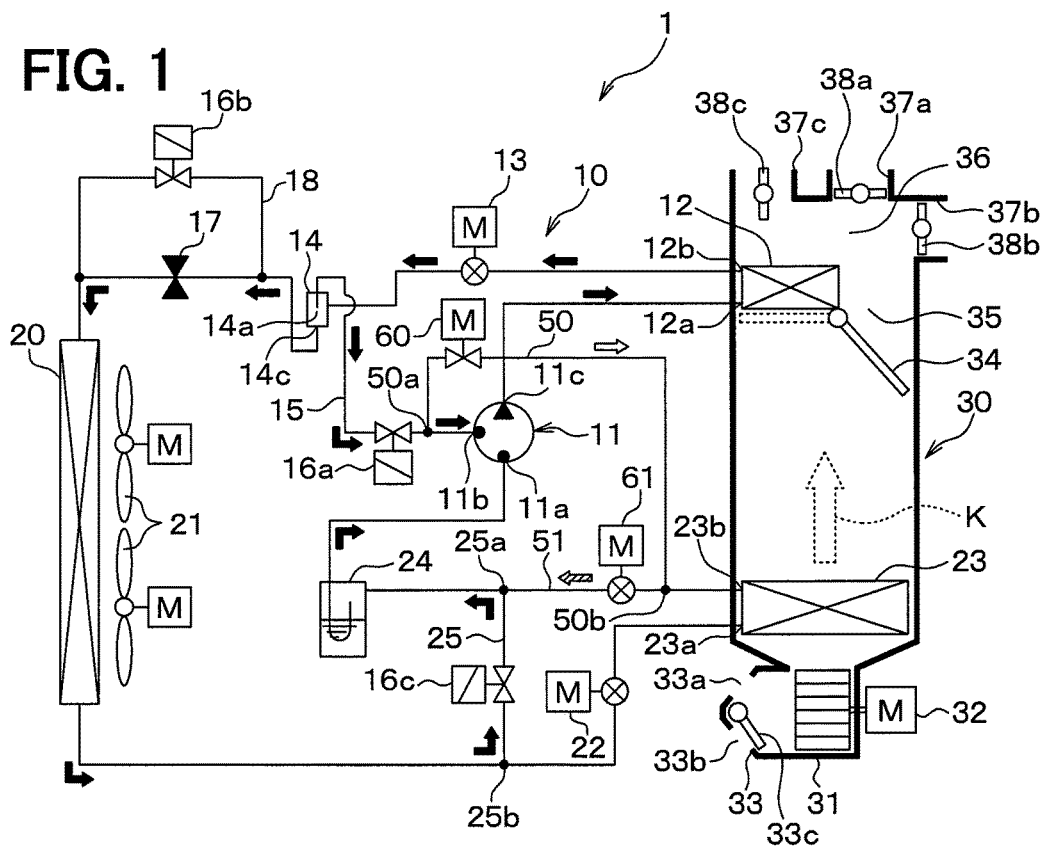
FIG. 1 is a diagram illustrating an overall configuration of a heat pump cycle according to a first embodiment, which is a diagram illustrating a flow of a refrigerant in a heating mode.

Hereinafter, embodiments for implementing the present disclosure will be described referring to drawings. The same or equivalent parts among the following respective embodiments are assigned the same reference numeral in the drawings for reduction of explanations.

(First Embodiment)

A first embodiment of the present disclosure will be described with reference to FIGS. 1 to 5. In the present embodiment, a heat pump cycle 10 according to the present disclosure is applied to a vehicle air conditioning apparatus 1 for an electric vehicle or a hybrid vehicle which obtains a vehicle travel driving force from a traveling electric motor. The heat pump cycle 10 performs a function of cooling or heating a vehicle interior blown air to be blown into a vehicle interior which is a vehicle interior of the present disclosure in the vehicle air conditioning apparatus 1.

Therefore, the heat pump cycle 10 according to the present embodiment switchably forms a refrigerant circuit in a heating mode (refer to FIG. 1) for heating a vehicle interior, a refrigerant circuit in a cooling mode (refer to FIG. 5) for cooling the vehicle interior, or a refrigerant circuit in a dehumidifying mode (refer to FIG. 5) for heating the vehicle interior while dehumidifying the vehicle interior. A refrigerant circuit in a normal heating mode, which will be described later, corresponds to a first refrigerant circuit, and a refrigerant circuit in a normal cooling mode corresponds to a second refrigerant circuit.

Further, as will be described later, the heat pump cycle 10 can execute a liquid accumulating mode (refer to FIG. 1) for accumulating a refrigerant which does not include a lubricant in an interior evaporator 23 at the time of implementing the heating mode, and a refrigerant shortage mode (refer to FIG. 1) for supplying the refrigerant to the refrigerant circuit from the interior evaporator 23 when an amount of refrigerant in the refrigerant circuit is short at the time of implementing the heating mode. In FIGS. 1, 5, 6, and 9, flows of the refrigerant in the respective operating modes are indicated by thick arrows, diagonally hatched arrows, white arrows, and solid arrows.

Also, the heat pump cycle 10 employs an HFC based refrigerant (specifically, R134a) as the refrigerant, and configures a vapor compression type subcritical refrigeration cycle in which the high-pressure side refrigerant pressure does not exceed a critical pressure of the refrigerant. It is needless to say that an HFO based refrigerant (for example, R1234yf) may be employed as the refrigerant. A lubricant functioning as a refrigerator oil for lubricating parts such as a compression mechanism and a bearing of the compressor 11 is mixed in the refrigerant, and the lubricant circulates in the refrigerant circuit together with the refrigerant.

In general, the amount of refrigerant to be enclosed is set to an amount obtained by adding a predetermined excess amount to a maximum circulation flow rate required to circulate in the cycle during a high load operation which exerts a maximum refrigeration capacity on the heat pump cycle 10. The excess amount is determined considering that the refrigerant enclosed in the cycle leaks to an outside through a rubber hose or other connecting portions which connect the respective components of the heat pump cycle 10 to each other due to aged use.

Among the components of the heat pump cycle 10, the compressor 11 is disposed in an engine hood of the vehicle, and draws, compresses, and discharges the refrigerant in the heat pump cycle 10. The compressor 11 is configured by a two-stage booster electric compressor in which two compression mechanisms having a low-stage side compression mechanism and a high-stage side compression mechanism, both of which are fixed displacement type compression mechanisms, and an electric motor that rotationally drives both of those compression mechanisms are housed inside a housing forming an outer shell of the compressor 11.

The housing of the compressor 11 is provided with an intake port 11a for drawing a low-pressure refrigerant from the outside of the housing to the low-stage side compression mechanism, an intermediate-pressure port 11b for causing the intermediate-pressure refrigerant to flow from the outside of the housing to the inside of the housing, and merge with the refrigerant in a compression process, and a discharge port 11c for discharging a high-pressure refrigerant discharged from the high-stage side compression mechanism to the outside of the housing. In this example, the intermediate-pressure port 11b is connected to a refrigerant discharge port side of the low-stage side compression mechanism (that is, the refrigerant intake port side of the high-stage side compression mechanism).

In other words, the compressor 11 compresses the refrigerant drawn through the intake port 11a to a refrigerant with an intermediate pressure lower than the high-pressure refrigerant (that is, the refrigerant in the compression process), and merges the compressed refrigerant with the refrigerant drawn through the intermediate-pressure port 11b into the high-pressure refrigerant.

The low-stage side compression mechanism and the high-stage side compression mechanism can be formed by various types of compression mechanisms such as a scroll-type compression mechanism, a vane-type compression mechanism, and a rolling piston-type compression mechanism.

The operation (that is, rotation speed) of the electric motor is controlled according to a control signal output from an electronic control device 40, which will be described later, and the electric motor may be formed by, for example, an AC synchronous motor. With the rotation speed control, a refrigerant discharge capacity of the compressor 11 is changed.

In the present embodiment, the compressor 11 in which the two compression mechanisms are accommodated in one housing is employed, but the type of the compressor is not limited to the above type. In other words, if the intermediate-pressure refrigerant is caused to flow from the intermediate-pressure port 11b to merge with the refrigerant in the compression process, the electric compressor may be configured such that a single fixed displacement type compression mechanism and an electric motor that rotationally drives the compression mechanism are housed inside of the housing.

An inlet 12a side of an interior condenser 12 is connected to the discharge port 11c of the compressor 11. The interior condenser 12 is disposed in an air conditioning case 31 of an interior air conditioning unit 30 of the vehicle air conditioning apparatus 1 to be described later. The interior condenser 12 is a radiator that radiates a heat from the high-pressure refrigerant discharged from the high-stage side compression mechanism of the compressor 11, and heats a vehicle interior blown air that has passed through the interior evaporator 23 to be described later.

An outlet 12b side of the interior condenser 12 is connected with an inlet side of a high-stage side expansion valve 13 functioning as a high-stage side pressure reducing means capable of reducing a pressure of the high-pressure refrigerant flowing out of the interior condenser 12 into the intermediate-pressure refrigerant.

The high-stage side expansion valve 13 is an electric variable throttle mechanism including a valve body of which a throttle opening is changeable and an actuator formed of a stepping motor that changes the throttle opening degree of the valve body. The throttle opening degree represents an opening degree of a refrigerant flow channel between an outlet of the interior condenser 12 and an inlet of a gas-liquid separator 14.

The high-stage side expansion valve 13 is configured so as to be put into a throttling state in which a pressure reducing action of the refrigerant is exerted and a fully opened state in which the pressure reducing action of the refrigerant is not exerted. In addition, the high-stage side expansion valve 13 can also close a refrigerant flow channel extending from an exterior heat exchanger 20 to the interior evaporator 23 with the throttle opening degree being fully closed. The operation of the high-stage side expansion valve 13 is controlled according to a control signal output from the electronic control device 40.

An outlet side of the high-stage side expansion valve 13 is connected with a refrigerant inflow port of the gas-liquid separator 14 as a separator that separates the intermediate-pressure refrigerant that has flowed out from the interior condenser 12 and whose pressure has been reduced by the high-stage side expansion valve 13 into a gas and a liquid.

The gas-liquid separator 14 according to the present embodiment is of a centrifugal separation type that separates the refrigerant drawn from the refrigerant inflow port into "a gas-phase refrigerant which does not include a lubricant" and "a remaining refrigerant including the lubricant" by the aid of a centrifugal force. The gas-liquid separator 14 of a type other than the centrifugal separation type may be used.

In this example, the gas-liquid separator 14 is provided with a gas-phase refrigerant outflow port 14a for discharging the gas-phase refrigerant which does not include the lubricant. As illustrated in FIG. 1, the intermediate-pressure port 11b of the compressor 11 is connected to the gas-phase refrigerant outflow port 14a through the intermediate-pressure refrigerant passage 15. An intermediate-pressure side on-off valve 16a is disposed in the intermediate-pressure refrigerant passage 15. The intermediate-pressure side on-off valve 16a is an electromagnetic valve that opens and closes the intermediate-pressure refrigerant passage 15, and the operation of the intermediate-pressure side on-off valve 16a is controlled according to a control signal output from the electronic control device 40.

The intermediate-pressure side on-off valve 16a also functions as a check valve that allows the refrigerant to only flow from the gas-phase refrigerant outflow port 14a of the gas-liquid separator 14 to the intermediate-pressure port 11b side of the compressor 11 when the intermediate-pressure refrigerant passage 15 is opened. This prevents the refrigerant from flowing back to the gas-liquid separator 14 from the compressor 11 side when the intermediate-pressure side on-off valve 16a opens the intermediate-pressure refrigerant passage 15. The intermediate-pressure side on-off valve 16a performs a function of switching the cycle configuration (that is, the refrigerant flow channel) by opening and closing the intermediate-pressure refrigerant passage 15.

On the other hand, the gas-liquid separator 14 is provided with a liquid-phase refrigerant outflow port 14c from which the remaining refrigerant liquid-phase refrigerant including the lubricant flows out. The liquid-phase refrigerant outflow port 14c of the gas-liquid separator 14 is connected with an inlet side of a low-stage side pressure reducing portion capable of reducing a pressure of the remaining liquid-phase refrigerant including the lubricant, and an outlet side of the low-stage side pressure reducing portion is connected with an inlet side of the exterior heat exchanger 20.

The low-stage side pressure reducing portion according to the present embodiment includes a low-stage side fixed throttle 17, a fixed throttle bypassing passage 18, and a low-pressure side on-off valve 16b. The low-stage side fixed throttle 17 reduces the pressure of the refrigerant flowing out from the liquid-phase refrigerant outflow port 14c of the gas-liquid separator 14 into the low-pressure refrigerant. The fixed throttle bypassing passage 18 leads the refrigerant flowing out from the liquid-phase refrigerant outflow port 14c of the gas-liquid separator 14 to the exterior heat exchanger 20 side while bypassing the low-stage side fixed throttle 17. The low-pressure side on-off valve 16b is a passage on-off valve that opens and closes the fixed throttle bypassing passage 18.

A basic configuration of the low-pressure side on-off valve 16b is the same as the intermediate-pressure side on-off valve 16a, which is an electromagnetic valve whose opening and closing operation is controlled according a control voltage output from the electronic control device 40.

In this example, a pressure loss occurring when the refrigerant passes through the low-pressure side on-off valve 16b is extremely small as compared with a pressure loss occurring when passing through the low-stage side fixed throttle 17. Therefore, the refrigerant that has flowed out from the interior condenser 12 flows into the exterior heat exchanger 20 through the fixed throttle bypassing passage 18 side when the low-pressure side on-off valve 16b is opened, and flows into the exterior heat exchanger 20 through the low-stage side fixed throttle 17 when the low-pressure side on-off valve 16b is closed.

As a result, the low-stage side pressure reducing portion can be changed to a throttling state in which a pressure reducing action is exerted and a fully opened state in which the pressure reducing action is not exerted due to opening and closing of the low-pressure side on-off valve 16b.

It should be noted that the low-pressure side on-off valve 16b may be configured by an electric three-way valve or the like. The three-way valve switches between a refrigerant circuit that connects the outlet side of the liquid-phase refrigerant outflow port 14c of the gas-liquid separator 14 and the inlet side of the low-stage side fixed throttle 17 and a refrigerant circuit that connects the outlet side of the liquid-phase refrigerant outflow port 14c and the inlet side of the fixed throttle bypassing passage 18.

The exterior heat exchanger 20 in FIG. 1 is disposed within an engine hood, and performs a heat exchange between the low-pressure refrigerant flowing in the exterior heat exchanger 20 and an outside air blown from a blower fan 21. The exterior heat exchanger 20 is a heat exchanger that functions as an evaporator configured to exert a heat absorbing action from an outside air by evaporating the low-pressure refrigerant at the time of executing the heating mode to be described later and functions as a radiator configured to radiate a heat of the high-pressure refrigerant to the outside air in the cooling mode. Furthermore, in the dehumidifying mode, the exterior heat exchanger 20 functions as a radiator that radiates the heat of the high-pressure refrigerant to the outside air or a heat absorber that absorbs the heat of the refrigerant from the outside air.

An outlet side of the exterior heat exchanger 20 is connected with an inlet side of a cooling expansion valve 22. The cooling expansion valve 22 reduces the pressure of the refrigerant that flows from the outlet of the exterior heat exchanger 20 into an inlet of the interior evaporator 23 at the time of implementing the cooling mode. The cooling expansion valve 22 is an electric variable throttle mechanism configured similarly to the high-stage side expansion valve 13. The cooling expansion valve 22 is configured so as to be put into a throttling state in which the pressure reducing action of the refrigerant is exerted, a fully opened state in which the pressure reducing action of the refrigerant is not exerted, and a fully closed state in which the throttle opening degree is fully closed. The throttle opening degree represents the opening degree of a refrigerant flow channel between the outlet of the exterior heat exchanger 20 and the inlet of the interior evaporator 23. The operation of the cooling expansion valve 22 is controlled according to a control signal that is output from the electronic control device 40.

An outlet side of the cooling expansion valve 22 is connected with an inlet 23a side of the interior evaporator 23. The interior evaporator 23 is disposed in the air flow upstream side of the interior condenser 12 along a vehicle interior blown air flow in the air conditioning case 31 of the interior air conditioning unit 30. The interior evaporator 23 is an evaporator that cools the vehicle interior blown air while evaporating the refrigerant flowing in the interior evaporator 23 to exert the heat absorbing action in the cooling mode, the dehumidifying mode, or the like.

An inlet side of an accumulator 24 is connected to an outlet 23b side of the interior evaporator 23 through a refrigerant flow channel 51. The accumulator 24 separates the refrigerant that has flowed into the inside of the accumulator 24 into the gas-phase refrigerant and the liquid-phase refrigerant and accumulates the liquid-phase refrigerant as an excessive refrigerant. Further, a gas-phase refrigerant outlet side of the accumulator 24 is connected with the intake port 11a of the compressor 11. Therefore, the accumulator 24 is connected to the intake port 11a so as to cause the gas-phase refrigerant to flow out to the intake port 11a side of the compressor 11.

An outlet side of the exterior heat exchanger 20 is connected with an expansion valve bypass passage 25 for leading the refrigerant that has flowed out of the exterior heat exchanger 20 to an inlet side of the accumulator 24 while bypassing the cooling expansion valve 22 and the interior evaporator 23. An outlet 25*a* of the expansion valve bypass passage 25 is connected to the refrigerant flow channel 51. A cooling on-off valve 16*c* for opening and closing the expansion valve bypass passage 25 is disposed in the expansion valve bypass passage 25. The refrigerant flow channel 51 is a refrigerant flow channel that connects between the outlet 23*b* of the interior evaporator 23 and the inlet of the accumulator 24.

A basic configuration of the cooling on-off valve 16*c* is the same as the intermediate-pressure side on-off valve 16*a*, which is an electromagnetic valve whose opening and closing operation is controlled according to a control voltage output from the electronic control device 40. In addition, a pressure loss occurring when the refrigerant passes through the cooling on-off valve 16*c* is extremely small as compared with a pressure loss occurring when the refrigerant passes through the cooling expansion valve 22. Therefore, the refrigerant that has flowed out of the exterior heat exchanger 20 flows into the accumulator 24 through the expansion valve bypass passage 25 when the cooling on-off valve 16*c* is opened.

In the present embodiment, a bypass passage 50 is provided for connecting between the intermediate-pressure refrigerant passage 15 and the outlet 23*b* of the interior evaporator 23 while bypassing the low-stage side fixed throttle 17, the fixed throttle bypassing passage 18, the low-pressure side on-off valve 16*b*, the exterior heat exchanger 20, and the cooling expansion valve 22. Specifically, an inlet 50*a* of the bypass passage 50 is connected between the outlet of the intermediate-pressure side on-off valve 16*a* and the intermediate-pressure port 11*b* of the compressor 11 in the intermediate-pressure refrigerant passage 15. An outlet 50*b* of the bypass passage 50 is connected between the outlet 23*b* of the interior evaporator 23 and an inlet of a frost preventing expansion valve 61 in the refrigerant flow channel 51.

A refrigerant accumulating on-off valve 60 is disposed between the inlet 50*a* and the outlet 50*b* of the bypass passage 50. The refrigerant accumulation valve 60 is an electromagnetic valve for opening and closing the bypass passage 50, and the operation of the refrigerant accumulating on-off valve 60 is controlled according to a control signal output from the electronic control device 40.

The frost preventing expansion valve 61 is connected between the outlet 50*b* side of the bypass passage 50 and the outlet 25*a* side of the expansion valve bypass passage 25 in the refrigerant flow channel 51.

The frost preventing expansion valve 61 is an electric variable throttle mechanism configured similarly to the high-stage side expansion valve 13 and the cooling expansion valve 22. The frost preventing expansion valve 61 is configured so as to be put into a throttling state in which the pressure reducing action of the refrigerant is exerted, a fully opened state in which the pressure reducing action of the refrigerant is not exerted, and a fully closed state in which the throttle opening degree is fully closed.

The throttle opening degree represents an opening degree of a refrigerant flow channel between the outlet 23*b* of the interior evaporator 23 and the inlet of the accumulator 24. The operation of the frost preventing expansion valve 61 is controlled according to the control signal that is output from the electronic control device 40.

Next, the interior air conditioning unit 30 will be described with reference to FIG. 1.

First, the interior air conditioning unit 30 is disposed inside of a dashboard panel (that is, instrument panel) on a foremost portion of the vehicle interior, and forms an outer shell of the interior air conditioning unit 30. The interior air conditioning unit 30 has the air conditioning case 31. The air conditioning case 31 forms an air passage of the vehicle interior blown air blown into the vehicle interior in the inside of the air conditioning case 31. A blower 32, the aforementioned interior condenser 12, the interior evaporator 23, and the like are accommodated in the air passage.

An inside and outside air switching device 33 is disposed on a most upstream side of the air conditioning case 31 along the air flow. The inside and outside air switching device 33 includes an inside air introduction port 33*a* for introducing the vehicle interior air into the air conditioning case 31, an outside air introduction port 33*b* for introducing the outside air into the air conditioning case 31, and an inside and outside air switching door 33*c* for opening and closing the introduction ports 33*a* and 33*b*. The inside and outside air switching device 33 continuously adjusts an opening area of the inside air introduction port 33*a* and an opening area of the outside air introduction port 33*b* by the inside and outside air switching door 33*c*, and continuously changes an air volume ratio of an inside air volume and an outside air volume.

The blower 32 that blows the air drawn through the inside and outside air switching device 33 toward the vehicle interior as indicated by an arrow K is disposed in the air flow downstream side of the inside and outside air switching device 33 along the air flow. The blower 32 is an electric blower that drives a centrifugal multi-blade fan (that is, sirocco fan) with an electric motor, and the number of rotations (that is, a blowing rate) of the blower 32 is controlled according to a control voltage that is output from the electronic control device 40.

The interior evaporator 23 and the interior condenser 12 described above are disposed on the air flow downstream side of the blower 32 in the stated order of the interior evaporator 23 and the interior condenser 12 along the flow of the vehicle interior blown air. In other words, the interior evaporator 23 is disposed on the air flow upstream side of the interior condenser 12 along the air flow.

A bypass passage 35 that bypasses the interior condenser 12 and blows the blown air that has passed through the interior evaporator 23 is provided in the air conditioning case 31. An air mixing door 34 is disposed on the air flow downstream side of the interior evaporator 23 and on the air flow upstream side of the interior condenser 12.

The air mixing door 34 adjusts the air volume ratio between the air volume passing through the interior condenser 12 and the air volume passing through the bypass passage 35 in the blown air that has passed through the interior evaporator 23 to adjust a heat exchange capability of the interior condenser 12. The air mixing door 34 is driven by a servomotor not shown whose operation is controlled according to a control signal output from the electronic control device 40.

A merging space 36 in which the vehicle interior blown air heated by heat exchange with the refrigerant in the interior condenser 12 and the interior blown air not heated by passing through the bypass passage 35 are merged with each other is provided on the air flow downstream side of the interior condenser 12 and the bypass passage 35.

Opening portions for blowing out the blown air merged in the merging space 36 into the vehicle interior as an air-conditioning target space are provided in a most downstream portion of the air conditioning case 31 along the air flow. Specifically, the openings include a defroster opening portion 37a for blowing an air conditioning wind toward an inside surface of a vehicle front window glass, a face opening portion 37b for blowing the air conditioning wind toward an upper half of an occupant in the vehicle interior, and a foot opening portion 37c for blowing the air conditioning wind toward an occupant's feet.

The air mixing door 34 adjusts the air volume ratio between the air volume allowed to pass through the interior condenser 12 and the air volume allowed to pass through the bypass passage, to thereby adjust a temperature of the blown air in the merging space 36.

Further, a defroster door 38a for adjusting the opening area of the defroster opening portion 37a, a face door 37b for adjusting the opening area of the face opening portion 37b, and a foot door 38c for adjusting the opening area of the foot opening portion 37c are disposed in the air flow upstream side of the defroster opening portion 37a, the face opening portion 37b, and the foot opening portion 37c along the air flow, respectively.

The defroster door 38a, the face door 38b, and the foot door 38c constitute an opening mode switching unit for switching the opening mode to another, and the operation of the opening mode switching unit is driven, through a link mechanism or the like, by a servomotor (not shown) whose operation is controlled according to a control signal output from the electronic control device 40.

The respective air flow downstream sides of the defroster opening portion 37a, the face opening portion 37b, and the foot opening portion 37c are connected to a defroster blowing port, a face blowing port, and a foot blowing port provided in the vehicle interior through ducts forming the respective air passages.

Figure 2:
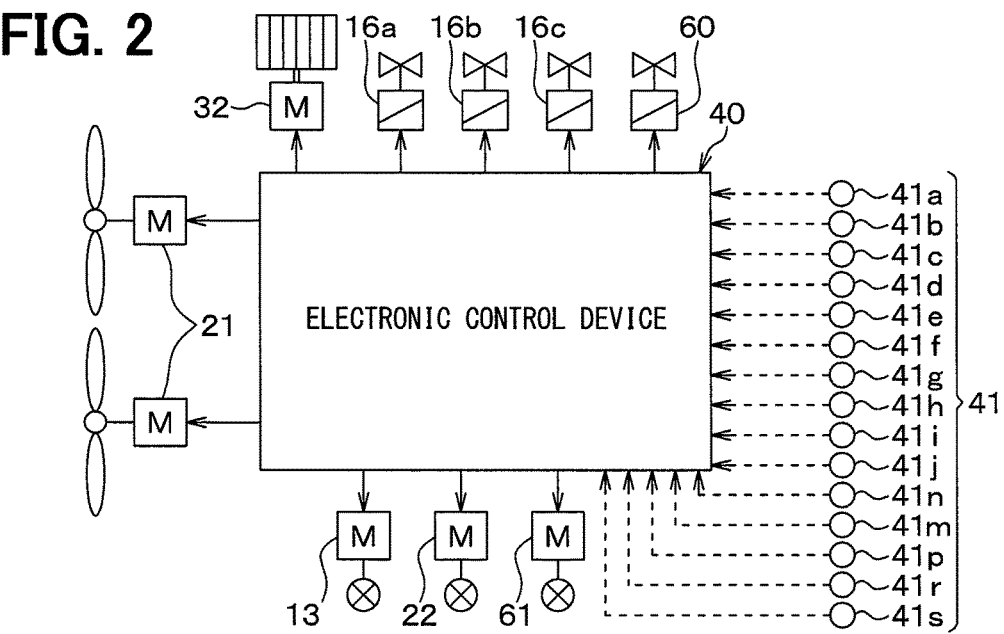
FIG. 2 is a diagram illustrating an electric configuration of the heat pump cycle in FIG. 1.
Figure 5:
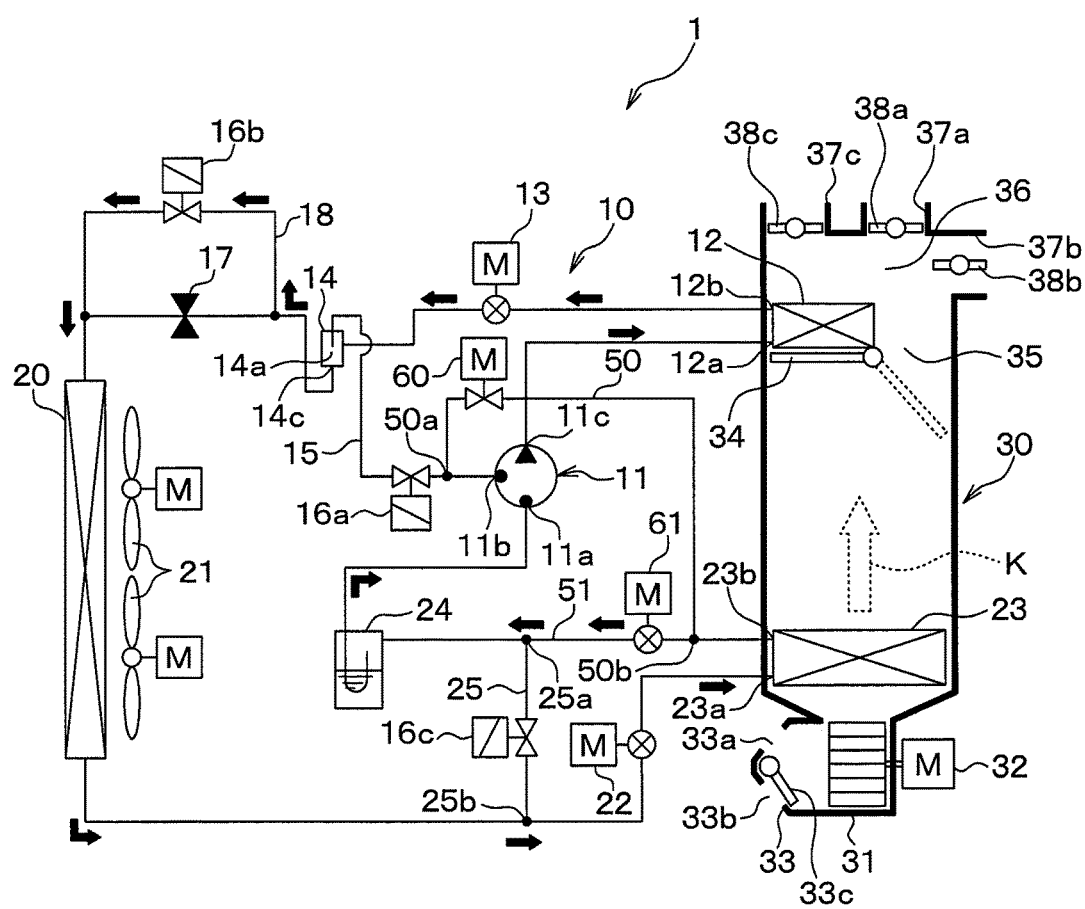
FIG. 5 is a diagram illustrating the overall configuration of the heat pump cycle according to the first embodiment, which is a diagram illustrating a flow of a refrigerant in a cooling mode and a dehumidifying mode.

Next, the electric control unit according to the present embodiment will be described with reference to FIG. 2.

The electronic control device 40 includes a well-known microcomputer that includes a CPU, a ROM, a RAM, and the like, and a peripheral circuit of the microcomputer. The electronic control device 40 performs various types of calculations and processes on the basis of an air conditioning control program stored in the ROM of the microcomputer, and controls the operation of various air-conditioning control devices connected to an output side of the electronic control device 40. Various air-conditioning control devices to be controlled includes the compressor 11, the high-stage side expansion valve 13, the intermediate-pressure side on-off valve 16a, the low-pressure side on-off valve 16b, the cooling on-off valve 16c, the cooling expansion valve 22, the refrigerant accumulating on-off valve 60, the frost preventing expansion valve 61, the blower 32, and the like.

A sensor group 41 for controlling the air conditioning is connected to an input side of the electronic control device 40. The sensor group 41 includes an inside air sensor 41a, an outside air sensor 41b, an insolation sensor 41c, an evaporator temperature sensor 41d, a heat exchanger temperature sensor 41e, a discharge pressure sensor 41f, refrigerant temperature sensors 41g, 41i, 41n, refrigerant pressure sensors 41h, 41j, 41m, a liquid level sensor 41p, a superheat degree sensor 41r, a heat exchanger temperature sensor 41s, and the like.

The inside air sensor 41a detects a vehicle interior temperature. The outside air sensor 41b detects an outside air temperature. The insolation sensor 41c detects an amount of insolation in the vehicle interior. The evaporator temperature sensor 41d detects an air temperature of the air blown out of the interior evaporator 23. The heat exchanger temperature sensor 41e detects an air temperature of air blown out of the exterior heat exchanger 20. The discharge pressure sensor 41f detects a pressure of the high-pressure refrigerant discharged from the compressor 11.

The refrigerant temperature sensor 41g detects a temperature of the outlet side refrigerant of the exterior heat exchanger 20. The refrigerant pressure sensor 41h detects a pressure of the outlet side refrigerant of the exterior heat exchanger 20. The outlet side refrigerant of the exterior heat exchanger 20 according to the present embodiment is a refrigerant flowing between the outlet of the exterior heat exchanger 20 and the inlet of the cooling on-off valve 16c.

The refrigerant temperature sensor 41i detects a temperature of the outlet side refrigerant of the interior condenser 12. The refrigerant pressure sensor 41j detects a pressure of the outlet side refrigerant of the interior condenser 12. The outlet side refrigerant of the interior condenser 12 according to the present embodiment is a refrigerant between the outlet of the interior condenser 12 and the inlet of the high-stage side expansion valve 13.

The refrigerant temperature sensor 41n detects a temperature of the outlet side refrigerant of the interior evaporator 23. The refrigerant pressure sensor 41m detects a pressure of the outlet side refrigerant of the interior evaporator 23. The outlet side refrigerant of the interior evaporator 23 according to the present embodiment is a refrigerant between the outlet of the interior evaporator 23 and the inlet of the accumulator 24. The liquid level sensor 41p detects a liquid surface height of the liquid-phase refrigerant in the accumulator 24. The superheat degree sensor 41r detects the degree of superheat of the discharged refrigerant discharged from the compressor 11. The heat exchanger temperature sensor 41s detects the blowing air temperature of the blown air blown out from the interior condenser 12.

Furthermore, an operation panel not shown which is arranged in the vicinity of an instrument panel positioned at a front portion in the vehicle interior, is connected to an input side of the electronic control device 40, and operation signals output from various air conditioning operation switches mounted on the operation panel are input to the input side of the electronic control device 40. Specifically, a start switch of the vehicle air conditioning apparatus 1, a vehicle interior temperature setting switch, an operation selection switch and the like are provided as the various air conditioning operation switches that are mounted on the operation panel. The vehicle interior temperature setting switch sets a set temperature Tset as a target temperature of the vehicle interior temperature. The operation selection switch selects the cooling mode, the heating mode, the dehumidifying mode, and the like.

The electronic control device 40 is integrated with control units for controlling the operation of various air-conditioning control devices that are connected to the output side of the electronic control device 40. A configuration (that is, hardware and software) for controlling the operation of each control target device forms the control unit for controlling the operation of each control target device.

For example, in the present embodiment, a configuration (that is, hardware and software) which controls the operation of the electric motor of the compressor 11 forms a discharge capacity control unit. A configuration (that is, hardware and software) for controlling the operation of the refrigerant flow channel switching means 16a to 16c forms a refrigerant flow channel control unit. It is needless to say that the discharge capacity control unit and the refrigerant flow channel control unit may be configured as separate control devices for the electronic control device 40.

Subsequently, the operation of the vehicle air conditioning apparatus 1 according to the present embodiment configured as described above will be described. FIG. 3 is a flowchart illustrating an air conditioning control process of the electronic control device 40.

The electronic control device 40 executes the air conditioning control process according to the flowchart of FIG. 3.

First, in Step 100, an operation mode to be executed among the cooling mode, the heating mode, and the dehumidifying mode is determined on the basis of a detected temperature of the outside air sensor 41b and a set temperature Tset.

For example, when the outside air temperature is equal to or higher than a predetermined temperature and the set temperature Tset is set to a temperature lower than the outside air temperature, the cooling mode is determined. When the outside air temperature is equal to or higher than the predetermined temperature and the set temperature Tset is set to a temperature higher than the outside air temperature, the dehumidifying mode is determined. Further, when the outside air temperature is lower than the predetermined temperature, the heating mode is determined. Alternatively, the operation mode to be executed among the cooling mode, the heating mode, and the dehumidifying mode is determined according to the operation of the operation select switch by the user.

For example, in Step 100, when the cooling mode is determined as the operation mode to be executed, the cooling mode is executed in Step 110. In Step 100, when the dehumidifying mode is determined as the operation mode to be executed, the dehumidifying mode is executed in Step 120.

On the other hand, in Step 100, when the heating mode is determined as the operation mode to be executed, the heating mode is executed as follows in Step 130. First, in Step 131, a count value T of a counter is reset and the count value T=0 is set. The counter is a counter that counts a time to continuously execute the liquid accumulating mode, which will be described later.

Next, in Step 132, it is determined whether the count value T of the counter has reached a threshold, or not. The threshold is a value corresponding to a predetermined time required to accumulate a predetermined amount of excessive refrigerant in the interior evaporator 23, and is determined in advance by experiments or the like.

At this time, if it is determined that the count value T of the counter has not reached the threshold, that is, "NO" in Step 132, the liquid accumulating mode is executed and the count value T of the counter is incremented in Step 133. The liquid accumulating mode is a mode in which the vehicle interior blown air is heated by the interior condenser 12 while the gas-phase refrigerant which does not include the lubricant is accumulated in the interior evaporator 23. In the liquid accumulating mode, the gas-phase refrigerant in the interior evaporator 23 is cooled and condensed by the vehicle interior blown air into a liquid-phase refrigerant, and the liquid-phase refrigerant is accumulated in the interior evaporator 23.

Thereafter, the process returns to Step 132. For that reason, the determination of "NO" in Step 132, the execution of the liquid accumulating mode, and the increment of the count value T of the counter in Step 133 are repeated until the count value T of the counter reaches the threshold. Thereafter, when the execution time of the liquid accumulating mode becomes equal to or longer than the predetermined time and the count value T of the counter becomes equal to or larger than the threshold, the determination of "YES" is executed in Step 132.

As a result, before the normal heating mode is executed, the liquid accumulating mode is continuously executed for a predetermined period of time. For that reason, a predetermined amount of liquid-phase refrigerant is accumulated in the interior evaporator 23 before the execution of the normal heating mode.

Thereafter, the normal heating mode is executed in Step 134. In the normal heating mode, the vehicle interior blown air is heated by the interior condenser 12 in a state in which a predetermined amount of refrigerant is accumulated in the interior evaporator 23.

In this example, in the normal heating mode, the exterior heat exchanger 20 functions as an evaporator for evaporating the refrigerant by heat exchange between the refrigerant and the outside air. For example, when the amount of refrigerant in the refrigerant circuit is short in the normal heating mode, the gas phase region where the gas-phase refrigerant is present in the exterior heat exchanger 20 increases. For that reason, the exterior heat exchanger 20 cannot exert a sufficient function as an evaporator for evaporating the refrigerant.

Under the circumstance, in Step 135, it is determined whether the amount of refrigerant in the refrigerant circuit in the normal heating mode is equal to or larger than a required refrigerant amount, or not. The required amount of refrigerant is the amount of refrigerant required to exert a sufficient heating capacity in the interior condenser 12 when implementing the normal heating mode. In other words, the required amount of refrigerant means the amount of refrigerant required to be present in the first refrigerant circuit when heating the air flow in the first interior heat exchanger 12 while circulating the refrigerant in the first refrigerant circuit.

Specifically, the degree of superheat of the refrigerant on the outlet side of the exterior heat exchanger 20 is calculated on the basis of the detected pressure of the refrigerant pressure sensor 41h and the detected temperature of the refrigerant temperature sensor 41g. Then, it is determined whether the degree of superheat of the refrigerant on the outlet side of the exterior heat exchanger 20 is positive, or not. In other words, it is determined whether the refrigerant on the outlet side of the exterior heat exchanger 20 is in a superheated state having a positive degree of superheat, or not. In other words, it is determined whether the refrigerant on the outlet side of the exterior heat exchanger 20 is not in a gas-liquid two-layer state but in a gas-phase state, or not. The refrigerant on the outlet side of the exterior heat exchanger 20 is a refrigerant between the outlet of the exterior heat exchanger 20 and the inlet of the cooling on-off valve 16c.

When the refrigerant on the outlet side of the exterior heat exchanger 20 is in the superheated state having the positive degree of superheat, the determination result is yes in Step 135. In other words, it is determined that the amount of refrigerant in the refrigerant circuit of the normal heating mode is less than the required refrigerant amount. Along with the above determination, in Step 136, the refrigerant shortage mode for returning the refrigerant from the interior condenser 12 to the refrigerant circuit of the normal heating mode is executed.

Along with the above execution, the process returns to Step 135, and it is determined whether the amount of refrigerant in the refrigerant circuit in the normal heating mode is equal to or larger than the required refrigerant amount. For that reason, the determination of yes in Step 135 and the refrigerant shortage mode (Step 136) are repeated until the amount of refrigerant in the refrigerant circuit of the normal heating mode becomes equal to or larger than the required refrigerant amount.

Thereafter, the amount of refrigerant in the refrigerant circuit becomes equal to or larger than the required refrigerant amount. Then, the refrigerant on the outlet side of the exterior heat exchanger 20 is not in the superheated state having the positive degree of superheat but in the gas-liquid two-layer state. For that reason, the determination result is no in Step 135. Along with the determination, the process returns to Step 134, and the normal heating mode is executed.

Thereafter, when the amount of refrigerant in the refrigerant circuit of the normal heating mode becomes equal to or larger than the required amount of refrigerant, the normal heating mode is executed. On the other hand, when the amount of refrigerant in refrigerant circuit of the normal heating mode becomes smaller than the required amount of refrigerant, the refrigerant shortage mode is executed. Hereinafter, the cooling mode, the dehumidifying mode, the normal heating mode, the liquid accumulating mode, and the refrigerant shortage mode will be described separately.

(Cooling Mode)

In the cooling mode, the electronic control device 40 brings the frost preventing expansion valve 61 in a valve opening state, brings the high-stage side expansion valve 13 into the fully opened state in which the pressure reducing action is not exerted, brings the cooling expansion valve 22 into the throttling state in which the pressure reducing action is exerted, and brings the cooling on-off valve 16c into the valve closing state.

Further, the electronic control device 40 brings the low-pressure side on-off valve 16b in the valve opening state, brings the low-stage side pressure reducing means in the fully opened state in which the pressure reducing action is not exerted, and brings the intermediate-pressure side on-off valve 16a in the valve closing state in conjunction with the state of the low-pressure side on-off valve 16b. As a result, the heat pump cycle 10 is switched to the refrigerant flow channel in which the refrigerant flows as indicated by thick arrows in FIG. 5.

In the configuration of the refrigerant flow channel, the electronic control device 40 reads the detection signals from the sensors 41a, 41b, and 41c described above, and the operation signals of the operation panel. Subsequently, the electronic control device 40 calculates a target blowing temperature TAO that is a target temperature of the blown out air that is blown out into the vehicle interior on the basis of values of the detection signals and the operation signals. The target blowing temperature TAO is a temperature required for the temperature detected by the inside air sensor 41a to maintain the set temperature Tset as the air temperature blown into the vehicle interior from the opening portions 37a, 37b, and 37c. Further, the electronic control device 40 determines operation states of the various air-conditioning control devices connected to the output side of the electronic control device 40 on the basis of the target blowing temperature TAO and the detection signals of the sensor group.

For example, the control signal for controlling the refrigerant discharge capacity of the compressor 11, that is, a rotation speed of the electric motor of the compressor 11 is determined as will be described below. First, the electronic control device 40 determines a target evaporator blowing temperature TEO of the interior evaporator 23 on the basis of the target blowing temperature TAO with reference to a control map that is stored in the electronic control device 40 in advance.

Subsequently, the control signal for controlling the electric motor of the compressor 11 is determined so that the blowout air temperature from the interior evaporator 23 comes closer to the target evaporator blowing temperature TEO under a feedback control on the basis of a deviation between the target evaporator air blowing temperature TEO and a blowing air temperature from the interior evaporator 23 detected by the evaporator temperature sensor 41d.

In this example, the throttle opening degree of the cooling expansion valve 22 is determined such that the degree of subcooling of the refrigerant flowing into the cooling expansion valve 22 comes closer to a target degree of subcooling determined in advance so as to bring a COP, that is, the coefficient of performance closer to a substantially maximum value. This makes it possible for the refrigerant in the interior evaporator 23 to exert the cooling capacity for cooling the vehicle interior blown air. The degree of subcooling is calculated based on the detected temperature of the refrigerant temperature sensor 41g and the detected pressure of the refrigerant pressure sensor 41h.

The throttle opening degree of the frost preventing expansion valve 61 is set so that the temperature of the interior evaporator 23 is equal to or higher than the threshold value in order to prevent the occurrence of frost on the interior evaporator 23. The throttle opening degree of the frost preventing expansion valve 61 is set on the basis of the detected temperature of the evaporator temperature sensor 41d.

Further, a control signal for controlling a servomotor of the air mixing door 34 is determined so that the air mixing door 34 closes the air passage of the interior condenser 12 and a total flow volume of the blown air that has passed through the interior evaporator 23 passes through the bypass passage 35.

The control signals determined as described above and so on are output to various air-conditioning control devices. Thereafter, a control routine, which includes the reading of the detection signals and the operation signals described above, the calculation of the target blowing temperature TAO, the determination of the operation states of the various air-conditioning control devices, and the output of the control voltages and the control signals, is repeated in the stated order in each predetermined control cycle until a stop of the operation of the vehicle air conditioning apparatus is required by the operation panel. Meanwhile, the repetition of the control routine described above is also performed in the same manner in other operation modes.

Therefore, in the heat pump cycle 10 of the cooling mode, the high-pressure refrigerant discharged from the discharge port 11c of the compressor 11 flows into the interior condenser 12. At this time, since the air mixing door 34 closes the air passage of the interior condenser 12, almost all of the refrigerant flowing into the interior condenser 12 flows out of the interior condenser 12 without radiating a heat to the vehicle interior blown air.

The refrigerant that has flowed out of the interior condenser 12 flows into the high-stage side expansion valve 13, the gas-liquid separator 14, and the low-pressure side on-off valve 16b in the stated order, and flows into the exterior heat exchanger 20. In more detail, since the high-stage side expansion valve 13 is in the fully opened state, the refrigerant that has flowed out of the interior condenser 12 flows out without being almost reduced in pressure by the high-stage side expansion valve 13, and flows into the gas-liquid separator 14 from the refrigerant inflow port of the gas-liquid separator 14.

For that reason, the refrigerant flowing into the gas-liquid separator 14 is in the gas-phase state having the degree of superheat. Therefore, in the gas-liquid separator 14, the refrigerant does not separate into the gas-phase refrigerant and the liquid-phase refrigerant, but flows out of the liquid-phase refrigerant outflow port 14c as the gas-phase refrigerant. Further, since the intermediate-pressure side on-off valve 16a is in the valve closing state, the gas-phase refrigerant does not flow out of the gas-phase refrigerant outflow port.

The gas-phase refrigerant flowing out of the liquid-phase refrigerant outflow port 14c flows out into the exterior heat exchanger 20 with almost no pressure reduction by the low-stage side pressure reducing means since the low-stage side pressure reducing means is in the fully opened state. In other words, in the low-stage side pressure reducing means, since the low-pressure side on-off valve 16b is in the valve opening state, the refrigerant flows into the exterior heat exchanger 20 through the fixed throttle bypassing passage 18 without flowing into the low-stage side fixed throttle 17 side. The gas-phase refrigerant that has flowed into the exterior heat exchanger 20 exchanges a heat with the outside air blown from the blower fan 21 and radiates the heat.

The refrigerant that has flowed out of the exterior heat exchanger 20 flows into the cooling expansion valve 22 because the cooling on-off valve 16c is in the valve closing state. For that reason, the refrigerant flowing out of the exterior heat exchanger 20 is reduced in pressure and expanded in an isenthalpic manner until the refrigerant becomes the low-pressure refrigerant by the cooling expansion valve 22. Then, the low-pressure refrigerant whose pressure has been reduced by the cooling expansion valve 22 flows into the interior evaporator 23, absorbs the heat from the vehicle interior blown air blown from the blower 32, and evaporates. With the above operation, the vehicle interior blown air is cooled.

The refrigerant that has flowed out of the interior evaporator 23 flows into the accumulator 24 through the frost preventing expansion valve 61 and is separated into the gas-phase refrigerant and the liquid-phase refrigerant by the accumulator 24. Then, the separated gas-phase refrigerant is drawn from the intake port 11a of the compressor 11 and again compressed in the stated order in the low-stage side compression mechanism and the high-stage side compression mechanism. On the other hand, the separated liquid-phase refrigerant is accumulated in the accumulator 24 as an excessive refrigerant which is not required for exerting the refrigeration capacity required by the cycle.

When the temperature of the interior evaporator 23 becomes lower than the threshold, the electronic control device 40 decreases the throttle opening degree of the frost preventing expansion valve 61, and increases the refrigerant pressure in the interior evaporator 23 to increase the temperature of the interior evaporator 23.

As described above, in the cooling mode, since the air passage of the interior condenser 12 is closed by the air mixing door 34, the blown air cooled by the interior evaporator 23 can be blown into the vehicle interior. As a result, the vehicle interior can be cooled.

As is apparent from the above description, in the cooling mode, the refrigerant that has flowed out of the interior condenser 12 flows into the high-stage side expansion valve 13 in the fully opened state, the gas-liquid separator 14, the fixed throttle bypassing passage 18, the low-pressure side on-off valve 16b, the exterior heat exchanger 20, the cooling expansion valve 22, the interior evaporator 23, the frost preventing expansion valve 61, the accumulator 24, the compressor 11, and the interior condenser 12 in the stated order.

(Dehumidifying Mode)

Next, the dehumidifying mode will be described.

When executing the dehumidifying mode, the electronic control device 40 puts the frost preventing expansion valve 61 into the valve opening state, puts the high-stage side expansion valve 13 into the fully opened state or the throttling state, puts the cooling expansion valve 22 into the fully opened state or the throttling state, and puts the cooling on-off valve 16c into the valve closing state. Further, the electronic control device 40 brings the low-pressure side on-off valve 16b in the valve opening state, brings the low-stage side pressure reducing means in the fully opened state in which the pressure reducing action is not exerted, and brings the intermediate-pressure side on-off valve 16a in the valve closing state in conjunction with the state of the low-pressure side on-off valve 16b. As a result, the heat pump cycle 10 is switched to the refrigerant flow channel in which the refrigerant flows as indicated by the thick arrows in FIG. 1 like to the cooling mode. The throttle opening degree of the frost preventing expansion valve 61 is set so that the temperature of the interior evaporator 23 is equal to or higher than the threshold value in order to prevent the occurrence of frost on the interior evaporator 23.

Further, a control signal to be output to a servomotor of the air mixing door 34 is determined so that the air mixing door 34 closes the bypass passage 35 and a total flow volume of the blown air that has passed through the interior evaporator 23 passes through the interior condenser 12.

Furthermore, in the dehumidifying mode of the present embodiment, the electronic control device 40 changes the throttle opening degrees of the high-stage side expansion valve 13 and the cooling expansion valve 22 according to a temperature difference between the set temperature and the outside air temperature. Specifically, the electronic control device 40 decreases the throttle opening degree of the high-stage side expansion valve 13 and increases the throttle opening degree of the cooling expansion valve 22 with an increase in the target blowing temperature TAO, to thereby execute four stage dehumidifying modes including a first dehumidifying mode to a fourth dehumidifying mode to be described below.

In the first dehumidifying mode, the high-stage side expansion valve 13 is brought into the fully opened state and the cooling expansion valve 22 is brought into the throttling state. Therefore, although the cycle configuration (that is, the refrigerant flow channel) is exactly the same as that in the cooling mode, the air mixing door 34 fully opens the air passage of the interior condenser 12.

For that reason, the high-pressure refrigerant discharged from the discharge port 11c of the compressor 11 flows into the interior condenser 12, and exchanges a heat with the vehicle interior blown air that has been cooled and dehumidified by the interior evaporator 23, and radiates the heat. Accordingly, the vehicle interior blown air is heated.

As in the cooling mode, the refrigerant that has flowed out of the interior condenser 12 flows into the high-stage side expansion valve 13, the gas-liquid separator 14, and the low-pressure side on-off valve 16b of the low-stage side pressure reducing means in the stated order, and flows into the exterior heat exchanger 20. Then, the low-pressure refrigerant that has flowed into the exterior heat exchanger 20 exchanges heat with the outside air blown from the blower fan 21 and radiates the heat. The subsequent operation is the same as that in the normal cooling mode.

As described above, in the first dehumidifying mode, the vehicle interior blown air which has been cooled and dehumidified by the interior evaporator 23 can be heated by the interior condenser 12 and blown into the vehicle interior. Therefore, dehumidifying heating in the vehicle interior can be achieved.

When the target blowing temperature TAO becomes higher than a predetermined first reference temperature during the execution of the first dehumidifying mode, the second dehumidifying mode is executed. When the target blowing temperature TAO becomes higher than a predetermined second reference temperature during the execution of the second dehumidifying mode, the third dehumidifying mode is executed. When the target blowing temperature TAO becomes higher than a predetermined third reference temperature during the execution of the third dehumidifying mode, the fourth dehumidifying mode is executed. Since the second, third, and fourth dehumidifying modes are similar to the technical contents disclosed in Patent Document 1, descriptions of the second, third, and fourth dehumidifying modes will be omitted.

(Normal Heating Mode)

Next, the normal heating mode will be described with reference to FIGS. 1 and 4.

The electronic control device 40 controls the rotation speed of the electric motor of the compressor 11 (that is, the refrigerant discharge capacity of the compressor 11) on the basis of the target blowing temperature TAO. For example, the control signal for controlling the electric motor of the compressor 11 is determined on the basis of a deviation so that the blowing air temperature from the interior condenser 12 comes closer to the target blowing temperature TAO under a feedback control. The deviation is a deviation between the target blowing temperature TAO and the blowing air temperature from the interior condenser 12 which has been detected by the heat exchanger temperature sensor 41s.

The electronic control device 40 controls the throttle opening degree in the high-stage side expansion valve 13 to set the high-stage side expansion valve 13 in the throttling state for exerting the pressure reducing action of the refrigerant. The throttle opening degree of the high-stage side expansion valve 13 is set such that the degree of subcooling of the refrigerant flowing from the interior condenser 12 to the high-stage side expansion valve 13 comes closer to a target degree of subcooling determined in advance so as to bring the COP closer to a substantially maximum value. This makes it possible for the refrigerant in the interior condenser 12 to exert the heating capacity for heating the vehicle interior blown air. In this example, the degree of subcooling is calculated based on the detected temperature of the refrigerant temperature sensor 41i and the detected pressure of the refrigerant pressure sensor 41j.

The electronic control device 40 brings the frost preventing expansion valve 61 and the cooling expansion valve 22 into the fully closed state, brings the cooling on-off valve 16c into the valve opening state, brings the low-pressure side on-off valve 16b into the valve closing state, and brings the low-stage side pressure reducing means into the throttling state in which the pressure reducing action is exerted.

The electronic control device 40 brings the intermediate-pressure side on-off valve 16a into the valve opening state in conjunction with the state of the low-pressure side on-off valve 16b. The electronic control device 40 controls the refrigerant accumulating on-off valve 60 to close the bypass passage 50. As a result, the heat pump cycle 10 is switched to the refrigerant flow channel in which the refrigerant flows as indicated by thick arrows in FIG. 1.

Further, a control signal for controlling a servomotor of the air mixing door 34 is determined so that the air mixing door 34 closes the bypass passage 35 and a total flow volume of the blown air that has passed through the interior evaporator 23 passes through the interior condenser 12.

Therefore, in the heat pump cycle 10 of the normal heating mode, the high-pressure refrigerant discharged from the discharge port 11c of the compressor 11 flows into the interior condenser 12. The refrigerant that flows into the interior condenser 12 radiates heat by exchanging heat between itself and the vehicle interior blown air that has been blown from the blower 32 and passed through the interior evaporator 23. Accordingly, the vehicle interior blown air is heated.

The refrigerant that has flowed from the interior condenser 12 is isenthalpically reduced in pressure and expanded by the high-stage side expansion valve 13 that is in the throttling state until the refrigerant reaches the intermediate-pressure refrigerant. The intermediate-pressure refrigerant whose pressure has been reduced by the high-stage side expansion valve 13 is separated into the gas-phase refrigerant from which the lubricant has been removed and the liquid-phase refrigerant containing the lubricant in the gas-liquid separator 14.

Since the intermediate-pressure side on-off valve 16a is in the valve opening state, the gas-phase refrigerant separated by the gas-liquid separator 14 (that is, the gas-phase refrigerant from which the lubricant has been removed) flows into the intermediate-pressure port 11b of the compressor 11 through the intermediate-pressure refrigerant passage 15, merges with the low-stage side compression mechanism discharged refrigerant, and is drawn into the high-stage side compression mechanism.

On the other hand, the liquid-phase refrigerant including the lubricant separated by the gas-liquid separator 14 is reduced in pressure into the low-pressure refrigerant by the low-stage side pressure reducing means since the low-stage side pressure reducing means is in the throttling state, and flows into the exterior heat exchanger 20. That is, in the low-stage side pressure reducing means, since the low-pressure side on-off valve 16b is in the valve closing state, the refrigerant is isenthalpically reduced in pressure and expanded until the refrigerant flows into the low-stage side fixed throttle 17 and becomes the low-pressure refrigerant. The refrigerant that has flowed out of the low-stage side fixed throttle 17 flows into the exterior heat exchanger 20 and exchanges a heat with the outside air blown from the blower fan 21 to absorb the heat.

The refrigerant that has flowed out of the exterior heat exchanger 20 flows into the accumulator 24 through the expansion valve bypass passage 25 and is separated into gas and liquid because the cooling on-off valve 16c is in the valve opening state. Then, the separated gas-phase refrigerant is drawn from the intake port 11a of the compressor 11 and again compressed. On the other hand, the separated liquid-phase refrigerant is accumulated in the accumulator 24 as an excessive refrigerant which is not required for exerting the refrigeration capacity required by the cycle.

As described above, in the normal heating mode, the heat of the refrigerant discharged from the compressor 11 in the interior condenser 12 can be radiated to the vehicle interior blown air, and the heated vehicle interior blown air can be blown into the vehicle interior. As a result, the vehicle interior can be heated.

Furthermore, in the normal heating mode, the low-pressure refrigerant whose pressure has been reduced by the low-stage side fixed throttle 17 is drawn from the intake port 11a of the compressor 11, and the intermediate-pressure refrigerant whose pressure has been reduced by the high-stage side expansion valve 13 flows into the intermediate-pressure port 11b so as to merge with the refrigerant in a pressure increasing process. In other words, a gas injection cycle (that is, an economizer type refrigeration cycle) can be configured.

Therefore, the mixture refrigerant low in temperature is drawn into the high-stage side compression mechanism, thereby being capable of improving the compression efficiency of the high-stage side compression mechanism. In addition, a pressure difference between the intake refrigerant pressure and the discharged refrigerant pressure of both of the low-stage side compression mechanism and the high-stage side compression mechanism is reduced, thereby being capable of improving the compression efficiency of both of those compression mechanisms. As a result, the COP of the entire heat pump cycle 10 can be improved.

As is apparent from the above description, in the normal heating mode, the refrigerant circuit is formed. In the refrigerant circuit, the refrigerant that has flowed out of the interior condenser 12 flows into the high-stage side expansion valve 13, the gas-liquid separator 14, the low-stage side pressure reducing means that is in the throttling state, the exterior heat exchanger 20, the cooling on-off valve 16c, the accumulator 24, the compressor 11, and the interior condenser 12 in the stated order. In the refrigerant circuit, the gas-phase refrigerant separated by the gas-liquid separator 14 flows into the intermediate-pressure refrigerant passage 15 and the intermediate-pressure port 11b of the compressor 11.

(Liquid Accumulating Mode)

Next, the liquid accumulating mode will be described with reference to FIGS. 1 and 4.

In the liquid accumulating mode, similarly to the normal heating mode, the electronic control device 40 controls the high-stage side expansion valve 13, the cooling expansion valve 22, the cooling on-off valve 16c, the low-pressure side on-off valve 16b, the intermediate-pressure side on-off valve 16a, and the frost preventing expansion valve 61.

For that reason, the high-stage side expansion valve 13 is put into the throttling state, the cooling expansion valve 22 is put into the fully closed state, and the cooling on-off valve 16c is put into the valve opening state. Further, the low-pressure side on-off valve 16b is brought into the valve closing state, the low-stage side pressure reducing means is brought into the throttling state in which the pressure reducing action is exerted, and the intermediate-pressure side on-off valve 16a is brought into the valve opening state in conjunction with the valve closing state of the low-pressure side on-off valve 16b. The frost preventing expansion valve 61 is put into the fully closed state.

With the above configuration, as indicated by thick arrows in FIG. 1, the heat pump cycle 10 allows the refrigerant that has flowed out of the interior condenser 12 to flow into the high-stage side expansion valve 13, the gas-liquid separator 14, the low-stage side pressure reducing means that is in the throttling state, the exterior heat exchanger 20, the cooling on-off valve 16c, and the accumulator 24 in the stated order. At the same time, as indicated by the thick arrows in FIG. 1, the heat pump cycle 10 allows the gas-phase refrigerant separated by the gas-liquid separator 14 to flow into the intermediate-pressure refrigerant passage 15, the intermediate-pressure side on-off valve 16a, and the intermediate-pressure port 11b of the compressor 11.

In addition to the above configuration, the electronic control device 40 puts the refrigerant accumulating on-off valve 60 in the valve opening state. In this example, a temperature of the interior evaporator 23 is equal to a temperature of the vehicle interior blown air, and a pressure in the interior evaporator 23 is lower than the refrigerant pressure in the intermediate-pressure refrigerant passage 15. For that reason, a part of the gas-phase refrigerant that has passed through the intermediate-pressure side on-off valve 16a flows into the intermediate-pressure port 11b of the compressor 11, but the remaining gas-phase refrigerant flows into the interior evaporator 23 through the bypass passage 50, the refrigerant accumulating on-off valve 60, and the outlet 23b of the interior evaporator 23. In the interior evaporator 23, the gas-phase refrigerant is cooled by the vehicle interior blown air and becomes the liquid-phase refrigerant. For that reason, in the interior evaporator 23, the excessive refrigerant is accumulated as the liquid-phase refrigerant.

As described above, in the liquid accumulating mode, the interior condenser 12 heats the vehicle interior blown air by the aid of the refrigerant and the excessive refrigerant is accumulated as the liquid-phase refrigerant in the interior evaporator 23.

(Refrigerant Shortage Mode)

Next, the refrigerant shortage mode will be described with reference to FIGS. 1 and 4.

In the refrigerant shortage mode, similarly to the normal heating mode, the electronic control device 40 controls the high-stage side expansion valve 13, the cooling expansion valve 22, the cooling on-off valve 16c, the low-pressure side on-off valve 16b, the intermediate-pressure side on-off valve 16a, and the refrigerant accumulating on-off valve 60. For that reason, the high-stage side expansion valve 13 is put into the throttling state, the cooling expansion valve 22 is put into the fully closed state, and the cooling on-off valve 16c is put into the valve opening state.

Further, the low-pressure side on-off valve 16b is brought into the valve closing state, the low-stage side pressure reducing means is brought into the throttling state in which the pressure reducing action is exerted, and the intermediate-pressure side on-off valve 16a is brought into the valve opening state in conjunction with the valve closing state of the low-pressure side on-off valve 16b, and the refrigerant accumulating on-off valve 60 is brought into the valve closing state.

With the above configuration, as indicated by thick arrows in FIG. 1, the heat pump cycle 10 allows the refrigerant that has flowed out of the interior condenser 12 to flow into the high-stage side expansion valve 13 that is in the throttling state, the gas-liquid separator 14, the low-stage side pressure reducing means that is in the throttling state, the exterior heat exchanger 20, the cooling on-off valve 16c, the accumulator 24, the compressor 11, and the interior condenser 12 in the stated order. At the same time, as indicated by the thick arrows in FIG. 1, the heat pump cycle 10 allows the gas-phase refrigerant separated by the gas-liquid separator 14 to flow into the intermediate-pressure refrigerant passage 15, the intermediate-pressure side on-off valve 16a, and the intermediate-pressure port 11b of the compressor 11.

In addition to the above configuration, the electronic control device 40 sets the throttle opening degree of the frost preventing expansion valve 61 to a predetermined opening degree. For that reason, the liquid-phase refrigerant in the interior evaporator 23 flows into the accumulator 24 through the outlet 23b of the interior evaporator 23, the frost preventing expansion valve 61, and the refrigerant flow channel 51 as indicated by hatched arrows. As a result, the amount of refrigerant in the refrigerant circuit in the heating mode can be increased.

As described above, in the refrigerant shortage mode, the interior condenser 12 heats the vehicle interior blown air by the aid of the refrigerant and the amount of refrigerant in the refrigerant circuit is increased.

The heat pump cycle 10 of the vehicle air conditioning apparatus 1 according to the present embodiment described above includes the compressor 11, the interior condenser 12, the gas-liquid separator 14, the exterior heat exchanger 20, the high-stage side expansion valve 13, the cooling expansion valve 22, and the accumulator 24. The compressor 11 compresses the low-pressure refrigerant drawn from the intake port 11a and discharges the compressed refrigerant as the high-pressure refrigerant. The interior condenser 12 heats the air flow blown toward the vehicle interior by the aid of the high-pressure refrigerant. The gas-liquid separator 14 separates the high-pressure refrigerant into the gas-phase refrigerant which does not include the lubricant and the remaining refrigerant other than the gas-phase refrigerant. The exterior heat exchanger 20 exchanges a heat between the remaining refrigerant flowing out of the gas-liquid separator 14 and the outside air. The interior evaporator 23 cools the air flow by the aid of the refrigerant that has passed through the exterior heat exchanger 20. The high-stage side expansion valve 13 controls the throttle opening degree of a refrigerant flow channel between the outlet of the interior condenser 12 and the inlet of the gas-liquid separator 14. The cooling expansion valve 22 controls the throttle opening degree of a refrigerant flow channel between the outlet of the exterior heat exchanger 20 and the inlet of the interior evaporator 23. The accumulator 24 supplies the gas-phase refrigerant including the lubricant to the compressor 11 while accumulating the liquid-phase refrigerant of the refrigerant discharged from the interior evaporator 23.

The electronic control device 40 control the throttle opening degree so as to reduce the pressure of the refrigerant in the high-stage side expansion valve 13 in order to exert the heating capacity in the interior condenser 12 in a state where the refrigerant is circulated in the refrigerant circuit while the gas-phase refrigerant from the gas-liquid separator 14 is accumulated in the interior evaporator 23. The refrigerant circuit includes the compressor 11, the interior condenser 12, the high-stage side expansion valve 13, the gas-liquid separator 14, the low-stage side fixed throttle 17, the exterior heat exchanger 20, the cooling expansion valve 22, the interior evaporator 23, the frost preventing expansion valve 61, and the accumulator 24.

With the above configuration, the gas-phase refrigerant discharged from the gas-liquid separator 14 can be accumulated in the interior evaporator 23 in a state where the heating capacity is exerted by the interior condenser 12. For that reason, a capacity of the accumulator 24 for accumulating the refrigerant can be reduced. Therefore, the size of the body of the accumulator 24 can be reduced.

In addition to the above configuration, the gas-phase refrigerant to be supplied from the gas-liquid separator 14 to the interior evaporator 23 is a refrigerant of the high-pressure refrigerant which does not include the lubricant in the gas-liquid separator 14. For that reason, the remaining refrigerant including the lubricant can be supplied to the compressor 11. Hence, a shortage of the lubricant to be supplied to the compressor 11 can be reduced.

As described above, the heat pump cycle 10 that reduces the shortage of the lubricant to be supplied to the compressor 11 while reducing the size of the accumulator 24 can be provided.

In the present embodiment, in the heating mode, since the refrigerant at an intermediate pressure higher than an atmospheric pressure is supplied to the interior evaporator 23, a predetermined amount of refrigerant can be accumulated in the interior evaporator 23 in a short time. The atmospheric pressure is a pressure in the interior evaporator 23 determined by the ambient temperature of the interior evaporator 23.

In the present embodiment, when it is determined in Step 100 that the heating mode should be performed, the liquid accumulating mode in Step 133 is implemented over a certain period of time. For that reason, the excessive refrigerant can be reliably accumulated in the interior evaporator 23.

In the present embodiment, when it is determined that the amount of refrigerant in the refrigerant circuit in the normal heating mode is smaller than the required amount of refrigerant, the refrigerant shortage mode is executed in Step 136 and the refrigerant can be returned from the interior evaporator 23 to the accumulator 24. For that reason, the normal heating mode can be normally implemented.

(Second Embodiment)

In the first embodiment, the execution of the heating mode in which the refrigerant is circulated in the refrigerant circuit in the state where the refrigerant is accumulated in the interior evaporator 23 is described, but in addition to the above example, in a second embodiment, an example in which a cooling mode is executed in a state where a liquid-phase refrigerant is accumulated in an interior condenser 12 will be described. Similarly, in the present embodiment, a refrigerant circuit in a normal heating mode corresponds to a first refrigerant circuit, and a refrigerant circuit in a normal cooling mode corresponds to a second refrigerant circuit.

Figure 6:
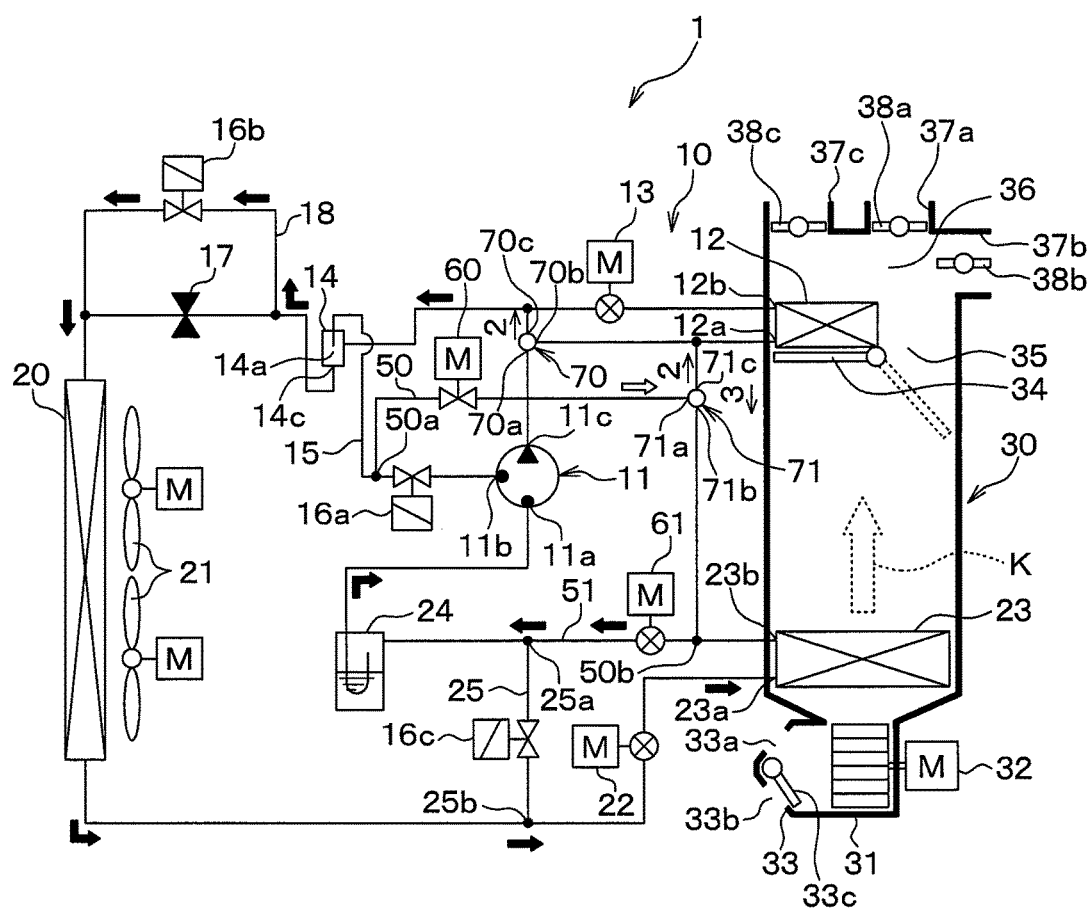
FIG. 6 is a diagram illustrating an overall configuration of a heat pump cycle according to a second embodiment, which is a diagram illustrating a flow of a refrigerant in a cooling mode and a dehumidifying mode.

FIG. 6 is a diagram illustrating an overall configuration of a heat pump cycle 10 according to the second embodiment. In FIG. 6, reference numerals identical with those of FIG. 1 indicate the same elements.

In the heat pump cycle 10 according to the present embodiment, three-way valves 70 and 71 are added to the heat pump cycle 10 of the first embodiment. The three-way valve 70 includes an inlet 70a and outlets 70b, 70c. The three-way valve 70 includes a valve body that connects between one of the outlets 70b and 70c and the inlet 70a and opens between the other outlet and the inlet 70a, and an actuator such as a stepping motor that drives the valve body.

The inlet 70a is connected to a discharge port 11c of a compressor 11. The outlet 70b is connected to an inlet 12a of an interior condenser 12. The outlet 70c is connected between an outlet of a high-stage side expansion valve 13 and a refrigerant inflow port of a gas-liquid separator 14.

The three-way valve 71 includes an inlet 71a, a gateway 71b, and a gateway 71c. The three-way valve 71 includes a valve body and an actuator such as a stepping motor for driving the valve body. The valve body connects between one of the gateway 71b and the gateway 71c and the inlet 71a and opens between the other gateway and the inlet 71a. Alternatively, while opening the space between the entrance 71b and the entrance 71a, the valve body connects between the gateway 71b and the gateway 71c in a state to open between the gateway 71c and the inlet 71a while opening between the gateway 71b and the inlet 71a.

The inlet 71a is connected to an outlet of a refrigerant accumulating on-off valve 60. The gateway 71b is connected between an outlet 23b of an interior evaporator 23 and an inlet of a frost preventing expansion valve 61. The gateway 71c is connected to the inlet 12a of the interior condenser 12. The actuator forming the three-way valve 70 and the actuator forming the three-way valve 71 according to the present embodiment are controlled by an electronic control device 40.

Incidentally, in the present embodiment, an inlet 50a of a bypass passage 50 is connected to the inlet side of an intermediate-pressure side on-off valve 16a in an intermediate-pressure refrigerant passage 15. The bypass passage 50 connects between the inlet 12a of the interior condenser 12 and the outlet 23b of the interior evaporator 23 through the three-way valve 71. For that reason, the bypass passage 50 forms a fourth bypass passage that connects between the inlet 12a of the interior condenser 12 and an inlet of an accumulator 24 while bypassing the gas-liquid separator 14, an exterior heat exchanger 20, and the interior evaporator 23.

Figure 7:
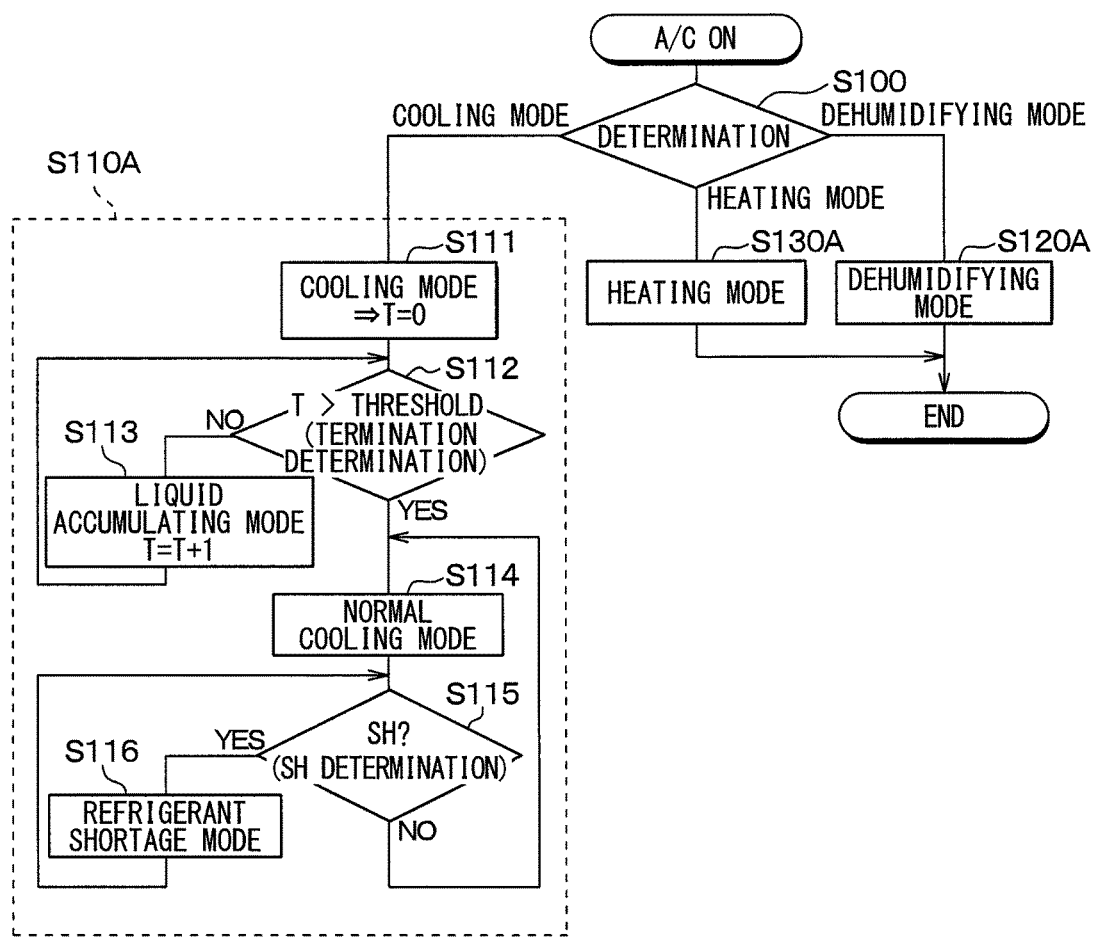
FIG. 7 is a flowchart illustrating a control process of an electronic control device in FIG. 6.

Subsequently, the operation of a vehicle air conditioning apparatus 1 according to the present embodiment configured as described above will be described. FIG. 7 is a flowchart illustrating an air conditioning control process of the electronic control device 40. In FIG. 7, the same reference numerals as those of FIG. 3 indicate the same components.

The electronic control device 40 executes the air conditioning control process according to the flowchart of FIG. 7.

First, in Step 100, when the heating mode is determined as the operation mode to be executed, the heating mode is executed in Step 130A. In Step 130A, Steps 131, 132, 133, 134, 135, and 136 are executed as in Step 130 of FIG. 3. In Step 100, when the dehumidifying mode is determined as the operation mode to be executed, the dehumidifying mode is executed in Step 120A. On the other hand, when the cooling mode is determined as the operation mode to be executed, the cooling mode is executed in subsequent Step 110A.

Specifically, in Step 111, a count value T of a counter is reset and the count value T=0 is set. The counter is a counter that counts a time to continuously execute the liquid accumulating mode in Step 113 which will be described later.

Next, in Step 112, it is determined whether the count value T of the counter has reached a threshold, or not. The threshold is a value corresponding to a predetermined time required to accumulate a predetermined amount of excessive refrigerant in the interior condenser 12, and is determined in advance by experiments or the like.

At this time, if it is determined that the count value T of the counter has not reached the threshold, that is, "NO" in Step 112, the liquid accumulating mode starts and the count value T of the counter is incremented in Step 113. In the liquid accumulating mode, the vehicle interior blown air is cooled by the interior evaporator 23 while the refrigerant flows into the interior condenser 12.

Then, the process returns to Step 112. For that reason, the determination of "NO" in Step 112, the execution of the liquid accumulating mode, and the increment of the count value T of the counter in Step 113 are repeated until the count value T of the counter reaches the threshold. Thereafter, when the execution time of the liquid accumulating mode becomes equal to or longer than the predetermined time and the count value T of the counter becomes equal to or larger than the threshold, the determination of "YES" is executed in Step 112.

Thereafter, the normal cooling mode is executed in Step 114. In the normal cooling mode, the vehicle interior blown air is cooled by the interior evaporator 23 in a state in which the refrigerant is accumulated in the interior condenser 12.

In this example, in the normal cooling mode, the interior evaporator 23 functions as an evaporator for evaporating the refrigerant by heat exchange between the refrigerant and the interior blown air. For example, when the amount of refrigerant in the refrigerant circuit is short in the normal cooling mode, the gas phase region where the gas-phase refrigerant is present in the interior evaporator 23 increases. For that reason, the interior evaporator 23 cannot exert a sufficient function as an evaporator for evaporating the refrigerant.

Under the circumstance, in Step 115, it is determined whether the amount of refrigerant in the refrigerant circuit in the normal cooling mode is equal to or larger than a required refrigerant amount, or not. The required amount of refrigerant is the amount of refrigerant required to exert a sufficient cooling capacity in the interior evaporator 23 when implementing the normal cooling mode. In other words, the required amount of refrigerant means the amount of refrigerant required to be present in the second refrigerant circuit when cooling the air flow in the second interior heat exchanger 23 while circulating the refrigerant in the second refrigerant circuit.

Specifically, it is determined whether the refrigerant on the outlet side of the interior evaporator 23 is in a superheated state having a positive degree of superheat, or not. In other words, it is determined whether the refrigerant on the outlet side of the interior evaporator 23 is not in a gas-liquid two-layer state but in a gas-phase state, or not. The degree of superheat of the refrigerant is calculated based on the detected temperature of a refrigerant temperature sensor 41n and the detected pressure of a refrigerant pressure sensor 41m.

In this example, when the refrigerant on the outlet side of the interior evaporator 23 is not in the gas-liquid two-layered state but in the gas-phase state, it is determined that the degree of superheat of the refrigerant on the outlet side of the interior evaporator 23 is positive, that is, as "YES" in Step 115. In this situation, it is determined that the amount of refrigerant in the refrigerant circuit of the normal cooling mode is smaller than a required amount of refrigerant. Along with the above determination, in Step 116, the refrigerant shortage mode for returning the refrigerant from the interior condenser 12 to the refrigerant circuit of the normal cooling mode is executed.

Next, returning to in Step 115, it is determined whether the amount of refrigerant in the refrigerant circuit in the normal cooling mode is equal to or larger than a required amount of refrigerant, or not. For that reason, the determination of "YES" in Step 115 and the refrigerant shortage mode (Step 116) are repeated so far as the amount of refrigerant in the refrigerant circuit of the normal cooling mode becomes smaller than the required amount of refrigerant.

Thereafter, when the refrigerant on the outlet side of the exterior heat exchanger 20 becomes not in the superheated state having the positive degree of superheat but in the gas-liquid two-layer state, the determination of "NO" is made in Step 115. Along with the above determination, the process returns to step 114.

Thereafter, when the amount of refrigerant in the refrigerant circuit of the normal cooling mode becomes equal to or larger than the required amount of refrigerant, the normal cooling mode is executed. On the other hand, when the amount of refrigerant in refrigerant circuit of the normal cooling mode becomes smaller than the required amount of refrigerant, the refrigerant shortage mode is executed.

Hereinafter, the cooling mode in Step 110A, the dehumidifying mode in Step 120A, and the heating mode in Step 130A will be described separately. First, the normal cooling mode, the liquid accumulating mode, and the refrigerant shortage mode in the cooling mode in Step 110A will be described with reference to FIGS. 6 and 8.

(Normal Cooling Mode)

In the normal cooling mode, the electronic control device 40 controls the three-way valve 70 to connect between the outlet 70c and the inlet 70a, open between the outlet 70b and the inlet 70a, and open between the outlets 70b and 70c. For that reason, in the three-way valve 70, a flow channel 2 in FIG. 6 for allowing the refrigerant to flow from the inlet 70a to the outlet 70c is provided.

The electronic control device 40 controls the three-way valve 71 to connect between the gateway 71c and the inlet 71a, open between the gateway 71b and the inlet 71a, and open between the gateways 71c and 71b. For that reason, in the three-way valve 71, the flow channel 2 in FIG. 6 for allowing the refrigerant to flow from the inlet 71a to the gateway 71c is provided. The electronic control device 40 puts the high-stage side expansion valve 13 into the valve closing state. As in the cooling mode of the first embodiment, the electronic control device 40 controls a cooling on-off valve 16c, a low-pressure side on-off valve 16b, the intermediate-pressure side on-off valve 16a, a cooling expansion valve 22, the refrigerant accumulating on-off valve 60, and the frost preventing expansion valve 61.

As a result, the heat pump cycle 10 forms the refrigerant flow channel in which the refrigerant flows as indicated by thick arrows in FIG. 6.

Specifically, the high-pressure refrigerant discharged from the compressor 11 flows into the exterior heat exchanger 20 through between the outlet 70c and the inlet 70a of the three-way valve 70, between the refrigerant inflow port and a liquid-phase refrigerant outflow port 14c of the gas-liquid separator 14, a fixed throttle bypassing passage 18, and the low-pressure side on-off valve 16b in the stated order. In the exterior heat exchanger 20, the high-pressure refrigerant is cooled by the outside air blown from a blower fan 21.

The high-pressure refrigerant flowing from the exterior heat exchanger 20 flows into the cooling expansion valve 22. In the cooling expansion valve 22, the pressure of the high-pressure refrigerant is reduced into the low-pressure refrigerant. The low-pressure refrigerant flows into the intake port 11a of the compressor 11 through the interior evaporator 23, the frost preventing expansion valve 61, and the accumulator 24 in the stated order. In the interior evaporator 23, the refrigerant cools the vehicle interior blown air.

With the above configuration, in the normal cooling mode, the vehicle interior blown air is cooled by the refrigerant in the interior condenser 12 in a state where the excessive refrigerant is accumulated as the liquid-phase refrigerant in the interior condenser 12.

(Liquid Accumulating Mode)

In the liquid accumulating mode, similarly to the normal cooling mode, the electronic control device 40 controls the three-way valves 70, 71, the high-stage side expansion valve 13, the cooling expansion valve 22, the intermediate-pressure side on-off valve 16a, the cooling on-off valve 16c, the low-pressure side on-off valve 16b, and the frost preventing expansion valve 61.

As a result, in the heat pump cycle 10, as indicated by thick arrows in FIG. 6, the high-pressure refrigerant discharged from the compressor 11 flows into the flow channel 2 of the three-way valve 70, a portion between the refrigerant inflow port of the gas-liquid separator 14 and the liquid-phase refrigerant outflow port 14c, the fixed throttle bypassing passage 18, the low-pressure side on-off valve 16b, the exterior heat exchanger 20, the cooling expansion valve 22, the interior evaporator 23, the frost preventing expansion valve 61, the accumulator 24, and the intake port 11a of the compressor 11 in the stated order.

In addition to the above configuration, the electronic control device 40 puts the refrigerant accumulating on-off valve 60 in the valve opening state. In this situation, in the three-way valve 71, the flow channel 2 for allowing the refrigerant to flow from the inlet 71a to the gateway 71c is provided.

In this example, the refrigerant flows from the compressor 11 into the gas-liquid separator 14 by bypassing the interior condenser 12. The refrigerant flowing into the gas-liquid separator 14 from the compressor 11 through the three-way valve 70 is a gas-phase refrigerant. For that reason, in the gas-liquid separator 14, the gas-phase refrigerant flowing from the compressor 11 through the three-way valve 70 is separated into the gas-phase refrigerant which does not include the lubricant and the remaining refrigerant other than the gas-phase refrigerant.

For that reason, the gas-phase refrigerant from which the lubricant has been removed flows from the gas-phase refrigerant outflow port of the gas-liquid separator 14 into the bypass passage 50. The gas-phase refrigerant flows into the bypass passage 50, the refrigerant accumulating on-off valve 60, a portion between the inlet 71a and the gateway 71c of the second flow channel of the three-way valve 71, and the inlet 12a of the interior condenser 12 in the stated order. In the interior condenser 12, the gas-phase refrigerant is cooled by the vehicle interior blown air and becomes the liquid-phase refrigerant. Therefore, in the interior condenser 12, the excessive refrigerant is accumulated as the liquid-phase refrigerant.

With the above configuration, in the liquid accumulating mode, the vehicle interior blown air can be cooled by the aid of the refrigerant in the interior condenser 12, and the gas-phase refrigerant can be accumulated in the interior condenser 12.

(Refrigerant Shortage Mode)

In the refrigerant shortage mode, similarly to the normal cooling mode, the electronic control device 40 controls the three-way valve 70, the cooling expansion valve 22, the intermediate-pressure side on-off valve 16a, the cooling on-off valve 16c, the low-pressure side on-off valve 16b, the refrigerant accumulating on-off valve 60, and the frost preventing expansion valve 61.

Further, the electronic control device 40 controls the three-way valve 71 to connect between the gateway 71c and the gateway 71b, open between the gateway 71c and the inlet 71a, and open between the inlet 71a and the gateway 71b. For that reason, in the three-way valve 71, a flow channel 3 in FIG. 6 for allowing the refrigerant to flow from the gateway 71c to the gateway 71b is provided.

As a result, in the heat pump cycle 10, as indicated by thick arrows in FIG. 6, the high-pressure refrigerant discharged from the compressor 11 flows into the flow channel 2 of the three-way valve 70, a portion between the refrigerant inflow port of the gas-liquid separator 14 and the liquid-phase refrigerant outflow port 14c, the fixed throttle bypassing passage 18, the low-pressure side on-off valve 16b, the exterior heat exchanger 20, the cooling expansion valve 22, the interior evaporator 23, the frost preventing expansion valve 61, the accumulator 24, and the intake port 11a of the compressor 11 in the stated order.

In addition to the above configuration, the refrigerant discharged from the inlet 12a of the interior condenser 12 flows into the bypass passage 50, a portion between the gateway 71c and the gateway 71b of the three-way valve 71, the frost preventing expansion valve 61, and the accumulator 24 in the stated order. As a result, the amount of refrigerant in the refrigerant circuit in the cooling mode can be increased.

As described above, in the refrigerant shortage mode, the vehicle interior blown air is cooled by the aid of the refrigerant in the interior evaporator 23, and the amount of refrigerant in the refrigerant circuit is increased.

(Heating Mode)

Next, the normal heating mode, the liquid accumulating mode, and the refrigerant shortage mode in the heating mode according to the present embodiment will be described with reference to FIGS. 9 and 10.

(Normal Heating Mode)

As in the normal heating mode according to the first embodiment, the electronic control device 40 controls the compressor 11, the high-stage side expansion valve 13, the cooling expansion valve 22, the intermediate-pressure side on-off valve 16a, the low-pressure side on-off valve 16b, the cooling on-off valve 16c, the refrigerant accumulating on-off valve 60, and the frost preventing expansion valve 61.

The electronic control device 40 controls the three-way valve 70 to connect between the outlet 70b and the inlet 70a, open between the outlet 70c and the inlet 70a, and open between the outlets 70b and 70c. For that reason, in the three-way valve 70, a flow channel 1 in FIG. 9 for allowing the refrigerant to flow from the inlet 70a to the outlet 70b is provided.

The electronic control device 40 controls the three-way valve 71 to connect between the gateway 71b and the inlet 71a, open between the gateway 71c and the inlet 71a, and open between the gateways 71b and 71c. For that reason, in the three-way valve 71, the flow channel 1 illustrated in FIG. 9 for allowing the refrigerant to flow from the inlet 71a to the gateway 71b is provided.

For that reason, the high-pressure refrigerant discharged from the discharge port 11c of the compressor 11 flows into a portion between the inlet 70a and the outlet 70b of the flow channel 1 of the three-way valve 70, the interior condenser 12, the high-stage side expansion valve 13, the gas-liquid separator 14, the low-stage side fixed throttle 17, the exterior heat exchanger 20, the cooling on-off valve 16c, the accumulator 24, and the intake port 11a of the compressor 11 in the stated order. Along with the above configuration, the gas-phase refrigerant separated by the gas-liquid separator 14 flows into the intermediate-pressure refrigerant passage 15, the intermediate-pressure side on-off valve 16a, and the intermediate-pressure port 11b of the compressor 11 in the stated order.

With the above configuration, the normal heating mode operates in the same manner as that of the normal heating mode of the first embodiment.

(Liquid Accumulating Mode)

As in the normal heating mode according to the second embodiment, the electronic control device 40 controls the compressor 11, the three-way valves 70, 71, the high-stage side expansion valve 13, the cooling expansion valve 22, the intermediate-pressure side on-off valve 16a, the low-pressure side on-off valve 16b, the cooling on-off valve 16c, and the frost preventing expansion valve 61.

In addition to the above configuration, the electronic control device 40 puts the refrigerant accumulating on-off valve 60 in the valve opening state. For that reason, a part of the gas-phase refrigerant that has passed through the intermediate-pressure side on-off valve 16a from the gas-phase refrigerant outflow port 14a of the gas-liquid separator 14 flows through the intermediate-pressure side on-off valve 16a into the intermediate-pressure port 11b of the compressor 11, but the remaining gas-phase refrigerant flows into the interior evaporator 23 through the bypass passage 50, the refrigerant accumulating on-off valve 60, and the outlet 23b of the interior evaporator 23.

In this example, the gas-phase refrigerant from which the lubricant has been removed by the gas-liquid separator 14 flows out of the gas-phase refrigerant outflow port 14a of the gas-liquid separator 14 into the intermediate-pressure refrigerant passage 15. For that reason, the gas-phase refrigerant from which the lubricant has been removed is accumulated in the interior evaporator 23. In the interior evaporator 23, the gas-phase refrigerant is cooled by the vehicle interior blown air and becomes the liquid-phase refrigerant. In the interior evaporator 23, the excessive refrigerant is accumulated as the liquid-phase refrigerant.

With the above configuration, in the liquid accumulating mode, as in the liquid accumulating mode of the heating mode according to the first embodiment, the interior condenser 12 heats the vehicle interior blown air by the aid of the refrigerant and the refrigerant as the excessive refrigerant is accumulated in the interior evaporator 23.

(Refrigerant Shortage Mode)

As in the refrigerant shortage mode of the heating mode according to the first embodiment, the electronic control device 40 controls the compressor 11, the high-stage side expansion valve 13, the cooling expansion valve 22, the intermediate-pressure side on-off valve 16a, the low-pressure side on-off valve 16b, the cooling on-off valve 16c, the refrigerant accumulating on-off valve 60, and the frost preventing expansion valve 61.

In addition to the above configuration, the electronic control device 40 controls the three-way valves 70 and 71 in the same manner as in the normal heating mode.

The high-pressure refrigerant discharged from the compressor 11 flows into the flow channel 1 of the three-way valve 70, the interior condenser 12, the high-stage side expansion valve 13, the low-stage side fixed throttle 17, the exterior heat exchanger 20, the cooling on-off valve 16c, the accumulator 24, and the intake port 11a of the compressor 11 in the stated order. Along with the above configuration, the gas-phase refrigerant separated by the gas-liquid separator 14 flows into the intermediate-pressure refrigerant passage 15, the intermediate-pressure side on-off valve 16a, and the intermediate-pressure port 11b of the compressor 11 in the stated order.

In addition to the above configuration, the electronic control device 40 sets the throttle opening degree of the frost preventing expansion valve 61 to a predetermined opening degree. For that reason, the liquid-phase refrigerant in the interior evaporator 23 flows into the accumulator 24 through the outlet 23b of the interior evaporator 23, the frost preventing expansion valve 61, and the refrigerant flow channel 51 as indicated by hatched arrows. As a result, the amount of refrigerant in the refrigerant circuit in the heating mode can be increased.

With the above configuration, in the refrigerant shortage mode, as in the refrigerant shortage mode of the heating mode in the above first embodiment, the interior condenser 12 heats the vehicle interior blown air by the aid of the refrigerant and the amount of refrigerant in the refrigerant circuit is increased.

(Dehumidifying Mode)

Next, the dehumidifying mode according to the present embodiment will be described with reference to FIGS. 7, 9, 11, and 12.

Figure 11:
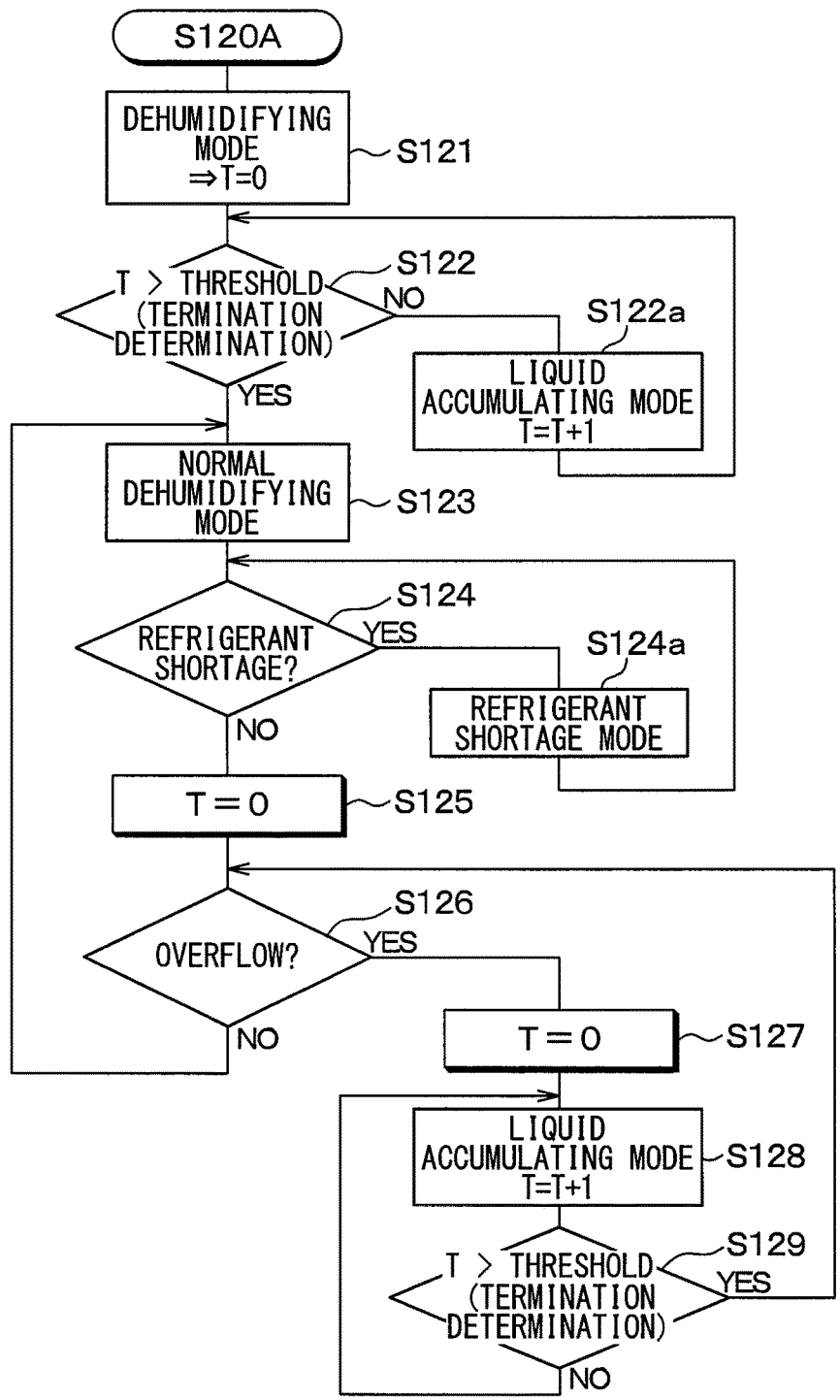
FIG. 11 is a flowchart illustrating a detail of a dehumidifying mode in the electronic control device in FIG. 7.

FIG. 11 is a flowchart illustrating the dehumidifying mode in Step 120A in FIG. 7.

First, in Step 100 of FIG. 7, when the dehumidifying mode is determined as the operation mode to be executed, the dehumidifying mode is executed in Step 120A of FIG. 11. First, in Step 121, a count value T of a counter is reset and the count value T=0 is set. The counter is a counter that counts a time to continuously execute the liquid accumulating mode in Steps 122a and 128 which will be described later.

Next, in Step 122, it is determined whether the count value T of the counter has reached a threshold, or not. The threshold is a value corresponding to a predetermined time required to accumulate a predetermined amount of excessive refrigerant in the exterior heat exchanger 20, and is determined in advance by experiments or the like.

At this time, if it is determined that the count value T of the counter has not reached the threshold, that is, "NO" in Step 122, the liquid accumulating mode is executed and the count value T of the counter is incremented in Step 122a. The liquid accumulating mode is a mode in which the refrigerant is accumulated in the exterior heat exchanger 20.

Thereafter, the process returns to Step 122. For that reason, the determination of "NO" in Step 122, the execution of the liquid accumulating mode, and the increment of the count value T of the counter in Step 122a are repeated until the count value T of the counter reaches the threshold. Thereafter, when the execution time of the liquid accumulating mode becomes equal to or longer than the predetermined time and the count value T of the counter becomes equal to or larger than the threshold, the determination of "YES" is executed in Step 122.

As a result, before the normal dehumidifying mode is executed, the liquid accumulating mode is continuously executed for a predetermined period of time. For that reason, a predetermined amount of refrigerant is accumulated in the exterior heat exchanger 20 before the execution of the normal dehumidifying mode.

Thereafter, the normal dehumidifying mode is executed in Step 123. In the normal dehumidifying mode, the vehicle interior blown air is heated by the interior condenser 12 while the vehicle interior blown air is cooled by the interior evaporator 23 in a state in which a predetermined amount of the refrigerant is accumulated in the exterior heat exchanger 20.

In this example, in the normal dehumidifying mode, the exterior heat exchanger 20 functions as a condenser for cooling and condensing the refrigerant by heat exchange between the refrigerant and the outside air, or a heat absorber for allowing the refrigerant to absorb the heat from the outside air. For example, when the amount of refrigerant in the refrigerant circuit is short in the normal dehumidifying mode, the gas phase region where the gas-phase refrigerant is present in the interior evaporator 23 increases. For that reason, the interior evaporator 23 cannot exert a sufficient function as an evaporator for evaporating the refrigerant.

Under the circumstance, in Step 124, it is determined whether the amount of refrigerant in the refrigerant circuit in the normal dehumidifying mode is equal to or larger than a required refrigerant amount, or not.

The required amount of refrigerant is the amount of refrigerant required to exert a sufficient heating capacity in the interior condenser 12 when implementing the normal dehumidifying mode. Specifically, it is determined whether the refrigerant on the outlet side of the interior evaporator 23 is in a superheated state having a positive degree of superheat, or not. In other words, it is determined whether the refrigerant on the outlet side of the interior evaporator 23 is not in a gas-liquid two-layer state but in a gas-phase state, or not. The degree of superheat of the refrigerant is calculated based on the detected temperature of the refrigerant temperature sensor $41n$ and the detected pressure of the refrigerant pressure sensor $41m$.

In this example, when the refrigerant on the outlet side of the interior evaporator 23 is not in the gas-liquid two-layered state but in the gas-phase state, it is determined that the degree of superheat of the refrigerant on the outlet side of the interior evaporator 23 is positive, that is, as "YES" in Step 124. In this situation, it is determined that the amount of refrigerant in the refrigerant circuit of the normal cooling mode is smaller than a required amount of refrigerant, and the refrigerant is short. Along with the above determination, in Step 124a, the refrigerant shortage mode for returning the refrigerant from the exterior heat exchanger 20 to the refrigerant circuit of the normal dehumidifying mode is executed.

Along with the above execution, the process returns to Step 124, and it is determined whether the amount of refrigerant in the refrigerant circuit in the normal dehumidifying mode is equal to or larger than the required refrigerant amount. For that reason, the determination of yes in Step 124 and the refrigerant shortage mode in Step 124a are repeated until the amount of refrigerant in the refrigerant circuit of the normal dehumidifying mode becomes equal to or larger than the required amount of refrigerant.

Thereafter, when the degree of superheat of the refrigerant on the outlet side of the interior evaporator 23 becomes not positive but in the gas-liquid two-layer state, the determination of "NO" is made in Step 124. Along with the above determination, the process proceeds to Step 1125, a count value T of a counter is reset and the count value T=0 is set.

Next, in Step 126, it is determined whether the liquid-phase refrigerant overflows from the accumulator 24, or not, based on the detection by the overflow detection means.

In the present embodiment, as the overflow detection means, a liquid level sensor $41p$ for detecting a liquid surface height of the liquid-phase refrigerant in the accumulator 24 or a superheat degree sensor $41r$ for detecting the degree of superheat of the discharged refrigerant of the compressor 11 can be used.

For example, it is determined whether the liquid surface height of the liquid-phase refrigerant in the accumulator 24 is equal to or more than a predetermined value, or not, based on the detection value of the liquid level sensor $41p$, to thereby determine whether the liquid-phase refrigerant overflows from the accumulator 24, or not. When the liquid surface height of the liquid-phase refrigerant in the accumulator 24 is equal to or higher than the predetermined value, it is determined that the liquid-phase refrigerant overflows from the accumulator 24.

For example, it is determined whether the degree of superheat of the discharged refrigerant discharged from the compressor 11 is equal to or lower than a predetermined value, or not, based on the superheat degree sensor $41r$, to thereby determine whether the liquid-phase refrigerant overflows from the accumulator 24, or not. When the degree of superheat of the discharged refrigerant in the compressor 11 is equal to or lower than the predetermined value, it is determined that the liquid-phase refrigerant overflows from the accumulator 24. As described above, the degree of superheat degree sensor 41r is a member that obtains the degree of superheat of the discharged refrigerant according to the temperature of the discharged refrigerant of the compressor 11, the pressure of the discharged refrigerant, or the like.

If it is determined as "YES" in Step 126 that the liquid-phase refrigerant overflows from the accumulator 24 in this way, the count value T of the counter is reset in Step 127 to set the count value T=0.

Next, in Step 128, the liquid accumulating mode is executed, and the count value T of the counter is incremented. The liquid accumulating mode is a mode in which the refrigerant is accumulated in the exterior heat exchanger 20, similarly to the liquid accumulating mode in Step 122a. Thereafter, in Step 129, it is determined whether the count value T of the counter has reached a threshold, or not. The threshold is a value corresponding to a predetermined time required to accumulate a predetermined amount of excessive refrigerant in the exterior heat exchanger 20, and is determined in advance by experiments or the like.

At this time, if it is determined that the count value T of the counter has not reached the threshold, as "NO" in Step 129, the process returns to Step 128, and the liquid accumulating mode is implemented. For that reason, the determination of "NO" in Step 129 and the liquid accumulating mode in Step 128 are repeated until the count value T of the counter reaches the threshold. Thereafter, when the count value T of the counter reaches the threshold value, the determination of "YES" is made in Step 129, and the liquid accumulating mode is completed.

Along with the above configuration, the process proceeds to Step 126, and if it is determined as "NO" that the liquid-phase refrigerant does not overflow from the accumulator 24, the process returns to Step 123. For that reason, if a state in which the liquid-phase refrigerant does not overflow from the accumulator 24 and the refrigerant is not short continues, the normal dehumidifying mode in Step 123, the determination of "NO" in the refrigerant shortage determination in Step 124, the reset process of the count value T in Step 125, and the determination of "NO" in the overflow determination in Step 126 are repeated until the determination of "YES" is made in Step 126.

Hereinafter, the normal dehumidifying mode in Step 123, the refrigerant shortage mode in Step 124a, and liquid accumulating mode in Steps 122a and 128 will be described.

First, the normal dehumidifying mode in Step 123 will be described.

In the normal dehumidifying mode, the electronic control device 40 controls the three-way valve 70 to connect between the outlet 70b and the inlet 70a, open between the outlet 70c and the inlet 70a, and open between the outlets 70b and 70c. For that reason, in the three-way valve 70, the flow channel 1 in FIG. 9 for allowing the refrigerant to flow from the inlet 70a to the outlet 70b is provided.

The electronic control device 40 controls the three-way valve 71 to connect between the gateway 71b and the inlet 71a, open between the gateway 71c and the inlet 71a, and open between the gateways 71b and 71c. For that reason, in the three-way valve 71, the flow channel 1 in FIG. 9 for allowing the refrigerant to flow from the inlet 70a to the outlet 70b is provided.

Alternatively, the electronic control device 40 controls the three-way valve 71 to connect between the gateway 71c and the inlet 71a, open between the gateway 71b and the inlet 71a, and open between the gateways 71b and 71c. For that reason, in the three-way valve 71, the flow channel 2 (refer to FIG. 9) for allowing the refrigerant to flow from the inlet 71a to the gateway 71c is provided.

The electronic control device 40 controls the throttle opening degree in the high-stage side expansion valve 13 to set the high-stage side expansion valve 13 in the throttling state for exerting the pressure reducing action of the refrigerant.

The electronic control device 40 controls the throttle opening degree in the cooling expansion valve 22 to puts the cooling expansion valve 22 into the throttling state for exerting the pressure reducing action of the refrigerant.

The throttle opening degree of the high-stage side expansion valve 13 and the throttle opening degree of the cooling expansion valve 22 are determined such that the degree of subcooling of the refrigerant flowing from the interior condenser 12 to the high-stage side expansion valve 13 comes closer to a target degree of subcooling determined in advance so as to bring the COP closer to a substantially maximum value. Alternatively, the throttle opening degree of the high-stage side expansion valve 13 and the throttle opening degree of the cooling expansion valve 22 are determined such that the degree of subcooling of the refrigerant flowing from the exterior heat exchanger 20 into the cooling expansion valve 22 comes closer to the target degree of subcooling determined in advance so as to bring the COP closer to a substantially maximum value. This makes it possible for the refrigerant in the interior condenser 12 to exert the heating capacity for heating the vehicle interior blown air.

The electronic control device 40 brings the low-pressure side on-off valve 16b in the valve opening state, brings the low-stage side pressure reducing portion in the fully opened state in which the pressure reducing action is not exerted, and brings the intermediate-pressure side on-off valve 16a in the valve closing state in conjunction with the state of the low-pressure side on-off valve 16b. The refrigerant accumulating on-off valve 60 is put into the valve closing state, the cooling on-off valve 16c is put into the valve closing state, and the throttle opening degree of the frost preventing expansion valve 61 is set so that the temperature of the interior evaporator 23 is equal to or higher than the threshold value in order to prevent the occurrence of frost on the interior evaporator 23. The throttle opening degree of the frost preventing expansion valve 61 is set on the basis of the detected temperature of the evaporator temperature sensor 41d.

Accordingly, the heat pump cycle 10 is formed in the refrigerant flow channel in which the refrigerant flows as indicated by solid arrows in FIG. 9.

Specifically, the high-pressure refrigerant discharged from the compressor 11 flows into the interior condenser 12 from a space between the inlet 70a and the outlet 70b of the three-way valve 70. For that reason, in the interior condenser 12, the refrigerant can heat the vehicle interior blown air. The high-pressure refrigerant that has passed through the interior condenser 12 is reduced in pressure by the high-stage side expansion valve 13. The refrigerant whose pressure has been reduced flows into the exterior heat exchanger 20 through a portion between the refrigerant inflow port and the liquid-phase refrigerant outflow port 14c of the gas-liquid separator 14, the fixed throttle bypassing passage 18, and the low-pressure side on-off valve 16b in the stated order. In the exterior heat exchanger 20, the high-pressure refrigerant is cooled by the outside air blown from the blower fan 21.

The refrigerant flowing from the exterior heat exchanger 20 flows into the cooling expansion valve 22. In the cooling expansion valve 22, the pressure of the refrigerant is reduced into the low-pressure refrigerant. The low-pressure refrigerant flows into the intake port 11a of the compressor 11 through the interior evaporator 23, the frost preventing expansion valve 61, and the accumulator 24 in the stated order. In the interior evaporator 23, the refrigerant cools the vehicle interior blown air.

With the above configuration, the vehicle interior blown air is heated by the interior condenser 12 while the vehicle interior blown air is cooled by the interior evaporator 23 in the state in which the excessive refrigerant of the gas-liquid two-layer state is accumulated in the exterior heat exchanger 20.

Next, the liquid accumulating mode in Step 122a and 128 in the present embodiment will be described.

In the liquid accumulating mode, the electronic control device 40 reduces the throttle opening degree of the cooling expansion valve 22 in comparison with the normal dehumidifying mode. Further, as in the normal dehumidifying mode in Step 123, the electronic control device 40 controls the three-way valves 70 and 71, the frost preventing expansion valve 61, the refrigerant accumulating on-off valve 60, the low-pressure side on-off valve 16b, the intermediate-pressure side on-off valve 16a, and the cooling on-off valve 16c. For that reason, as in the normal dehumidifying mode in the above Step 123, while accumulating the excessive refrigerant in the gas-liquid two-layer state in the exterior heat exchanger 20, the refrigerant discharged from the compressor 11 flows into the intake port 11a of the compressor 11 through the three-way valve 70, the interior condenser 12, the high-stage side expansion valve 13, the gas-liquid separator 14, the fixed throttle bypassing passage 18, the low-pressure side on-off valve 16b, the exterior heat exchanger 20, the cooling expansion valve 22, the interior evaporator 23, the frost preventing expansion valve 61, and the accumulator 24 in the stated order. For that reason, the amount of refrigerant circulating in the refrigerant circuit of the normal dehumidifying mode can be reduced.

Further, when the normal dehumidifying mode is implemented in Step 123, if the heating capacity of the interior condenser 12 is short, the intermediate-pressure side on-off valve 16a may be opened. As a result, the gas-phase refrigerant from the gas-phase refrigerant outflow port 14a of the gas-liquid separator 14 can be supplied to the compressor 11 through the intermediate-pressure side on-off valve 16a and the intermediate-pressure port 11b. As a result, a gas injection cycle can be formed.

Next, the refrigerant shortage mode in Step 124a according to the present embodiment will be described.

In the refrigerant shortage mode, the electronic control device 40 increases the throttle opening degree of the cooling expansion valve 22 in comparison with the liquid accumulating mode. Further, as in the normal dehumidifying mode in Step 123, the electronic control device 40 controls the three-way valves 70 and 71, the frost preventing expansion valve 61, the refrigerant accumulating on-off valve 60, the low-pressure side on-off valve 16b, the intermediate-pressure side on-off valve 16a, and the cooling on-off valve 16c.

For that reason, while the flow rate of the excessive refrigerant flowing into the cooling expansion valve 22 from the exterior heat exchanger 20 is increased, as in the normal dehumidifying mode in the above Step 123, the refrigerant discharged from the compressor 11 flows into the intake port 11a of the compressor 11 through the three-way valve 70, the interior condenser 12, the high-stage side expansion valve 13, the gas-liquid separator 14, the fixed throttle bypassing passage 18, the low-pressure side on-off valve 16b, the exterior heat exchanger 20, the cooling expansion valve 22, the interior evaporator 23, the frost preventing expansion valve 61, and the accumulator 24 in the stated order. For that reason, the amount of refrigerant circulating in the refrigerant circuit of the normal dehumidifying mode can be increased.

According to the present embodiment described above, the electronic control device 40 controls the throttle opening degree so as to reduce the pressure of the refrigerant in the cooling expansion valve 22 in order to exert the cooling capacity in the interior evaporator 23 in a state where the refrigerant is circulated in the refrigerant circuit while the gas-phase refrigerant from which the lubricant has been removed is accumulated in the interior condenser 12 by the gas-liquid separator 14 in the cooling mode.

The electronic control device 40 control the throttle opening degree so as to reduce the pressure of the refrigerant in the high-stage side expansion valve 13 in order to exert the heating capacity in the interior condenser 12 in a state where the refrigerant is circulated in the refrigerant circuit while the gas-phase refrigerant from which the lubricant has been removed is accumulated in the interior evaporator 23 by the gas-liquid separator 14 in the heating mode.

With the above configuration, in the cooling mode, the gas-phase refrigerant from which the lubricant has been removed in the gas-liquid separator 14 can be accumulated as the excessive refrigerant in the interior condenser 12 in a state where the cooling capacity is exerted by the interior evaporator 23. In the heating mode, the gas-phase refrigerant from which the lubricant has been removed in the gas-liquid separator 14 can be accumulated as the excessive refrigerant in the interior evaporator 23 in a state where the heating capacity is exerted by the interior condenser 12. For that reason, a capacity of the accumulator 24 for accumulating the excessive refrigerant can be reduced. Therefore, the size of the accumulator 24 can be reduced.

In addition to the above configuration, the gas-phase refrigerant to be supplied from the gas-liquid separator 14 to the interior condenser 12 or the interior evaporator 23 is a refrigerant of the high-pressure refrigerant which does not include the lubricant in the gas-liquid separator 14. For that reason, the remaining refrigerant including the lubricant can be supplied to the compressor 11. Hence, a shortage of the lubricant to be supplied to the compressor 11 can be reduced.

As described above, the heat pump cycle 10 that reduces the shortage of the lubricant to be supplied to the compressor 11 while reducing the size of the accumulator 24 can be provided.

In the present embodiment, as in the first embodiment, in the heating mode, since the refrigerant of the intermediate pressure is supplied to the interior evaporator 23, a predetermined amount of refrigerant can be accumulated in the interior evaporator 23 in a short time.

In the present embodiment, in the cooling mode, since the high-pressure refrigerant higher than the atmospheric pressure is supplied to the interior condenser 12, a predetermined amount of refrigerant can be accumulated in the interior condenser 12 in a short time. The atmospheric pressure is a pressure in the interior condenser 12 determined by the ambient temperature of the interior condenser 12.

In the present embodiment, when it is determined in Step 100 that the cooling mode should be performed, the liquid accumulating mode in Step 113 is implemented over a certain period of time. For that reason, the excessive refrigerant can be reliably accumulated in the interior condenser 12.

In the present embodiment, when it is determined that the amount of refrigerant in the refrigerant circuit in the normal cooling mode is smaller than the required amount of refrigerant, the refrigerant shortage mode is executed in Step 116 and the refrigerant can be returned from the interior condenser 12 to the accumulator 24. For that reason, the normal cooling mode can be normally implemented.

(Other Embodiments)

In the first and second embodiments, the example in which the degree of superheat of the refrigerant flowing out of the exterior heat exchanger 20 is calculated based on the detected temperature of the refrigerant temperature sensor 41g and the detected pressure of the refrigerant pressure sensor 41h has been described. Alternatively, the above example may be replaced as follows. That is, the degree of superheat of the refrigerant may be calculated based on the detected temperature of the refrigerant pressure sensor 41h and the detected temperature of the outside air sensor 41b.

In the first and second embodiments, the example in which the degree of superheat of the refrigerant that has flowed out of the interior evaporator 23 is calculated based on the detected temperature of the refrigerant temperature sensor 41n and the detected pressure of the refrigerant pressure sensor 41m has been described. Alternatively, the above example may be replaced as follows. That is, the degree of subcooling may be calculated based on the detected temperature of the refrigerant temperature sensor 41n and the detected temperature of the outside air sensor 41b.

In the first embodiment, the example in which the inlet 50a of the bypass passage 50 is connected between the outlet of the intermediate-pressure side on-off valve 16a and the intermediate-pressure port 11b of the compressor 11 has been described. Alternatively, the inlet 50a of the bypass passage 50 may be connected between the inlet of the intermediate-pressure side on-off valve 16a and the gas-phase refrigerant outflow port 14a of the gas-liquid separator 14.

In the second embodiment, the example in which the inlet 50a of the bypass passage 50 is connected between the inlet of the intermediate-pressure side on-off valve 16a and the gas-phase refrigerant outflow port 14a of the gas-liquid separator 14 has been described. Alternatively, the inlet 50a of the bypass passage 50 may be connected between the outlet of the intermediate-pressure side on-off valve 16a and the intermediate-pressure port 11b of the compressor 11.

In the first and second embodiments, the example in which the heat pump cycle 10 according to the present disclosure is applied to the vehicle air conditioning apparatus 1 has been described. Alternatively, the heat pump cycle 10 according to the present disclosure may be applied to an installation type air conditioning system for air-conditioning a room of a house, a building or the like.

In the first and second embodiments, the example in which the high-stage side expansion valve 13 is configured by the electric type variable throttle mechanism has been described. Alternatively, the following configuration may be applied. The high-stage side expansion valve 13 may be configured by a variable throttle mechanism in which an expansion valve is combined with an electromagnetic valve that opens and closes the refrigerant flow channel. Similarly, the cooling expansion valve 22 and the frost preventing expansion valve 61 may be configured by a variable throttle mechanism in which an expansion valve is combined with an electromagnetic valve that opens and closes the refrigerant flow channel.

In the first and second embodiments described above, the example in which the switching valve according to the present disclosure is configured by the three-way valve 70 or the three-way valve 71 as one valve device has been described. Alternatively, the switching valve according to the present disclosure may be configured by combining two electromagnetic valves together.

In the first and second embodiments, the example in which the compressor including the intake port 11a, the intermediate-pressure port 11b, and the discharge port 11c is used as the compressor 11 according to the present disclosure has been described. Alternatively, the following configuration may be employed. That is, the compressor that does not include the intermediate-pressure port 11b and does not draw the gas-phase refrigerant from the gas-phase refrigerant outflow port 14a may be used as the compressor 11 of the present disclosure.

In the first and second embodiments, the example in which the intermediate-pressure side on-off valve 16a is opened in the liquid accumulating mode of the heating mode has been described. Alternatively, in the liquid accumulating mode of the heating mode, the intermediate-pressure side on-off valve 16a may be closed.

In the first embodiment, the example in which the outlet of the refrigerant accumulating on-off valve 60 is connected to the outlet 23b of the interior evaporator 23 has been described. Alternatively, the outlet of the refrigerant accumulating on-off valve 60 may be connected to the inlet 23a of the interior evaporator 23.

In the second embodiment, the example in which the gateway 71b of the three-way valve 71 is connected to the outlet 23b of the interior evaporator 23 has been described. Alternatively, the gateway 71b of the three-way valve 71 may be connected to the inlet 23a of the interior evaporator 23.

In the second embodiment, the example in which, in the liquid accumulating mode of the cooling mode, the gateway 71c of the three-way valve 71 is connected to the inlet 12a of the interior condenser 12 has been described. Alternatively, the gateway 71c of the three-way valve 71 may be connected to the outlet 12b of the interior condenser 12.

In the second embodiment, the example in which, in the normal dehumidifying mode, the refrigerant cools the vehicle interior blown air by the interior evaporator 23 while the refrigerant heats the vehicle interior blown air by the interior condenser 12 in the state in which the excessive refrigerant is accumulated in the exterior heat exchanger 20 has been described. This may be replaced as follows.

In other words, in the normal dehumidifying mode, the refrigerant may heat the vehicle interior blown air by the interior condenser 12 while the refrigerant may cool the vehicle interior blown air by the interior evaporator 23 in a state in which the excessive refrigerant is not accumulated in the exterior heat exchanger 20.

In addition, the present disclosure is not limited to the above-described embodiments, and can be appropriately changed. In addition, each of the above-described embodiments is related to each other, and can be appropriately combined with each other except for a case where the combination is apparently impossible. In the above-described respective embodiments, elements configuring the embodiments are not necessarily indispensable as a matter of course, except when the elements are particularly specified as indispensable and the elements are considered as obviously indispensable in principle. In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle. In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

Next, a correspondence relationship between the components of the above-described embodiment and the respective components of the present disclosure will be described.

The interior condenser 12 corresponds to a first interior heat exchanger, the gas-liquid separator 14 corresponds to a separator, and the interior evaporator 23 corresponds to a second interior heat exchanger. The high-stage side expansion valve 13 corresponds to a first control valve, and the cooling expansion valve 22 corresponds to a second control valve. The expansion valve bypass passage 25 corresponds to a first bypass passage, and Step 133 corresponds to a first control unit. The bypass passage 50 corresponds to a second bypass passage, the refrigerant accumulating on-off valve 60 corresponds to a first on-off valve, Step 133 corresponds to a first refrigerant accumulating unit, and Step 132 corresponds to a first execution unit. Step 134 corresponds to a heating unit, Step 135 corresponds to a first refrigerant amount determination unit, and the frost preventing expansion valve 61 corresponds to a third control valve. Step 136 corresponds to a first refrigerant supply unit, Step 113 corresponds to a second control unit and a second refrigerant accumulating unit, the third bypass passage corresponds to the bypass passage 50, the first bypass on-off valve corresponds to the refrigerant accumulating on-off valve 60 and the three-way valve 71. The second refrigerant accumulating unit corresponds to Step 113, Step 114 corresponds to a cooling unit, the fourth bypass passage corresponds to the bypass passage 50, the second bypass on-off valve corresponds to the three-way valve 71, and Step 115 corresponds to a second refrigerant amount determination unit. Step 112 corresponds to a second execution unit. Step 116 corresponds to a second refrigerant supply unit. The air conditioning mode determination unit corresponds to Step 100, the three-way valve 71 corresponds to a first switching valve, and the three-way valve 70 corresponds to a second switching valve. Step 133 corresponds to a first switching control unit, and Step 113 corresponds to a second switching control unit.

What is claimed is:

1. A heat pump cycle comprising:
   a compressor that draws a refrigerant containing a lubricant, compresses the drawn refrigerant, and discharges the compressed refrigerant as a high-pressure refrigerant;
   a first interior heat exchanger in which the high-pressure refrigerant heats an air flow blown into a vehicle interior;
   a separator that separates the refrigerant discharged from the compressor into a gas-phase refrigerant which does not include the lubricant and a remaining refrigerant other than the gas-phase refrigerant;
   an exterior heat exchanger that performs heat exchange between the remaining refrigerant that has flowed out of the separator and an outside air;
   a second interior heat exchanger in which the refrigerant that has passed through the exterior heat exchanger cools the air flow;
   a first control valve that controls an opening degree of a refrigerant flow channel positioned between an outlet of the first interior heat exchanger and an inlet of the separator;
   a second control valve that controls an opening degree of a refrigerant flow channel positioned between an outlet of the exterior heat exchanger and an inlet of the second interior heat exchanger;
   an accumulator that separates a refrigerant that has flowed out of the second interior heat exchanger through a refrigerant passage into a liquid-phase refrigerant and a gas-phase refrigerant, and supplies the gas-phase refrigerant to the compressor while accumulating the liquid-phase refrigerant;
   a first bypass passage that bypasses the second interior heat exchanger and the second control valve to connect a first part of the refrigerant passage and the outlet of the exterior heat exchanger;
   a gas phase outflow port provided in the separator, from which the gas-phase refrigerant which does not include the lubricant flows out;
   a second bypass passage connecting the gas phase outflow port of the separator and a second part of the refrigerant passage which is between the outlet of the second interior heat exchanger and the first part of the refrigerant passage, the second bypass passage bypassing the exterior heat exchanger and the second control valve;
   an on-off valve that opens and closes the second bypass passage;
   a third control valve disposed between the first part and the second part in the refrigerant passage to open and close the refrigerant passage; and
   a controller configured to perform a liquid accumulating mode in which the controller is programmed to:
      heat the air flow in the first interior heat exchanger and control the first control valve to reduce a pressure of the refrigerant by controlling the opening degree of the refrigerant flow channel positioned between the outlet of the first interior heat exchanger and the inlet of the separator;
      close the second control valve to circulate the refrigerant in a refrigerant circuit including the compressor, the first interior heat exchanger, the first control valve, the separator, the exterior heat exchanger, the first bypass passage and the accumulator; and
      open the on-off valve and close the third control valve to accumulate the gas-phase refrigerant that has flowed out of the separator in the second interior heat exchanger.

2. The heat pump cycle according to claim 1, wherein the controller is configured to continue the liquid accumulating mode for a predetermined period.

3. The heat pump cycle according to claim 1, wherein the controller is configured to control, after the control of the first control valve, the on-off valve to close the second bypass passage and circulate the refrigerant in the refrigerant circuit, the controller being configured to heat the air flow in the first interior heat exchanger and control the first control valve to reduce the pressure of the refrigerant by controlling the opening degree of the refrigerant flow channel positioned between the outlet of the first interior heat exchanger and the inlet of the separator.

4. The heat pump cycle according to claim 3, wherein
the controller determines whether an amount of refrigerant in the refrigerant circuit is smaller than a required amount of refrigerant when the controller controls the first control valve;
the controller is configured to increase the amount of refrigerant in the refrigerant circuit by controlling the third control valve to open the refrigerant passage between the outlet of the second interior heat exchanger and the inlet of the accumulator and supply the refrigerant from the second interior heat exchanger to the accumulator through the third control valve when the controller determines that the amount of refrigerant in the refrigerant circuit is smaller than the required amount of refrigerant.

5. The heat pump cycle according to claim 4, wherein the controller determines whether the amount of refrigerant in the refrigerant circuit is smaller than the required amount of refrigerant by determining whether the refrigerant flowing out of the exterior heat exchanger has a positive degree of superheat in a superheated state.

* * * * *